US011310704B2

(12) United States Patent
Fang et al.

(10) Patent No.: US 11,310,704 B2
(45) Date of Patent: Apr. 19, 2022

(54) SECONDARY COMMUNICATION NODE CHANGE

(71) Applicant: ZTE Corporation, Guangdong (CN)

(72) Inventors: Jianmin Fang, Guangdong (CN); He Huang, Guangdong (CN)

(73) Assignee: ZTE Corporation, Guangdong (CN)

( * ) Notice: Subject to any disclaimer, the term of this patent is extended or adjusted under 35 U.S.C. 154(b) by 98 days.

(21) Appl. No.: 17/037,281

(22) Filed: Sep. 29, 2020

(65) Prior Publication Data

US 2021/0014750 A1    Jan. 14, 2021

Related U.S. Application Data

(63) Continuation of application No. PCT/CN2018/081220, filed on Mar. 30, 2018.

(51) Int. Cl.
*H04W 36/00* (2009.01)
*H04W 76/15* (2018.01)
(Continued)

(52) U.S. Cl.
CPC ... *H04W 36/0069* (2018.08); *H04W 36/0079* (2018.08); *H04W 76/15* (2018.02);
(Continued)

(58) Field of Classification Search
CPC ......... H04W 36/0069; H04W 36/0079; H04W 76/15; H04W 76/18; H04W 76/19;
(Continued)

(56) References Cited

U.S. PATENT DOCUMENTS 9,888,412 B2 * 2/2018 Xu ................... H04W 72/0406
9,936,427 B2 * 4/2018 Sivanesan ......... H04W 36/0069
(Continued)

FOREIGN PATENT DOCUMENTS

CN    101990221 A    3/2011
CN    103686891 A    3/2014
(Continued)

OTHER PUBLICATIONS

Chinese Office Action dated Mar. 29, 2021 for Chinese Patent Application No. 201880086914.0, filed on Mar. 30, 2018 (14 pages).
(Continued)

*Primary Examiner* — Ahmed Elallam

(57) ABSTRACT

Methods, systems, and devices related to mobility robustness in dual connectivity mode are described. In one representative aspect, a method for wireless communication includes receiving, at a master communication node, a first message from a first secondary communication node requesting a change from a first connection to a second connection. The method includes transmitting a second message to the second secondary communication node to request establishing the second connection. The method includes receiving a third message from the mobile device confirming a configuration of the second connection. The method includes receiving a fourth message from the mobile device indicating a failure of the second connection. The method further includes transmitting a fifth message to the first secondary communication node to report that the change from the first connection to the second connection is an improper change.

20 Claims, 21 Drawing Sheets

(51) Int. Cl.
*H04W 76/19* (2018.01)
*H04W 76/25* (2018.01)
*H04W 76/18* (2018.01)

(52) U.S. Cl.
CPC ........... *H04W 76/18* (2018.02); *H04W 76/19* (2018.02); *H04W 76/25* (2018.02)

(58) Field of Classification Search
CPC . H04W 76/25; H04W 36/0058; H04W 36/08; H04W 36/18; H04W 36/22; H04W 76/34; H04W 36/04
See application file for complete search history.

(56) References Cited

U.S. PATENT DOCUMENTS

| | | | | |
|---|---|---|---|---|
| 10,524,277 | B2* | 12/2019 | Kubota | H04W 36/08 |
| 10,638,377 | B2 | 4/2020 | Futaki et al. | |
| 10,728,947 | B2* | 7/2020 | Teyeb | H04W 76/18 |
| 10,856,356 | B2* | 12/2020 | Wu | H04W 76/27 |
| 11,039,349 | B2* | 6/2021 | Xu | H04W 36/0061 |
| 11,122,453 | B2* | 9/2021 | Yiu | H04W 24/10 |
| 2013/0316713 | A1 | 11/2013 | Xu et al. | |
| 2016/0044744 | A1* | 2/2016 | Lee | H04W 16/32 |
| | | | | 370/329 |
| 2017/0019811 | A1 | 1/2017 | Parulkar | |
| 2017/0055187 | A1 | 2/2017 | Kang et al. | |
| 2018/0359800 | A1* | 12/2018 | Wu | H04W 76/15 |
| 2019/0090144 | A1* | 3/2019 | Wu | H04L 41/0668 |
| 2020/0169922 | A1* | 5/2020 | Ozturk | H04W 36/08 |
| 2020/0336364 | A1* | 10/2020 | Takahashi | H04W 76/19 |
| 2021/0168673 | A1* | 6/2021 | Fan | H04W 76/18 |
| 2021/0168689 | A1* | 6/2021 | Shimoda | H04W 76/19 |
| 2021/0377755 | A1* | 12/2021 | Luo | H04W 52/0258 |

FOREIGN PATENT DOCUMENTS

| | | |
|---|---|---|
| CN | 105247823 A | 1/2016 |
| CN | 106301857 A | 1/2017 |
| CN | 107690163 A | 2/2018 |
| CN | 107852658 A | 3/2018 |
| WO | 2014119921 A1 | 8/2014 |
| WO | 2015/115761 A1 | 8/2015 |
| WO | 2017000250 A1 | 1/2017 |

OTHER PUBLICATIONS

NEC, "[Draft] LS on SCG failure indication in LTE-NR DC," 3GPP TSG-RAN WG2 NR Ad-Hoc#2, Qingdao, China, R2-1707378, 1 page, Jun. 27-29, 2017.

Japanese Office Action dated Dec. 7, 2021 for Japanese Patent Application No. 2021-501064, filed on Sep. 30, 2020, 13 pages, with unofficial machine translation.

ZTE, "Baseline pCR to RAN2 TS 37.340 covering agreements of RAN3#97," 3GPP TSG-RAN WG3 Meeting#97 R3-173458, Berlin, Germany, Aug. 21-25, 2017, 40 pages.

European Extended Search Report dated Mar. 5, 2021 for EP Application No. P18913133.7, (12 pages).

NEC, "SCG failure indication from MN to SN," R2-1707377, 3GPP TSG-RAN WG2 NR Ad-Hoc#2 Qingdao, China, Jun. 27-29, 2017, 4 pages.

Ericsson, "Introduction of option 3—Dual Connectivity with NR in E-UTRAN—RAN3 parts" 3GPP TSG-RAN WG3, R3-171827 Meeting #96 Hangzhou, P.R. China, May 15-19, 2017, 37 pages.

International Search Report and Written Opinion dated Dec. 29, 2018 for International Application No. PCT/CN2018/081220, filed on Mar. 30, 2018 (7 pages).

* cited by examiner

SECONDARY COMMUNICATION NODE CHANGE

CROSS REFERENCE TO RELATED APPLICATIONS

This patent document is a continuation of and claims benefit of priority to International Patent Application No. PCT/CN2018/081220, filed on Mar. 30, 2018. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to mobility robustness in dual connectivity mode.

In one representative aspect, a method for wireless communication is disclosed. The method includes receiving, at a master communication node, a first message from a first secondary communication node requesting a change from a first connection between a mobile device and the first secondary communication node to a second connection between the mobile device and a second secondary communication node. The first message includes information identifying the second secondary communication node. The method includes transmitting, from the master communication node, a second message to the second secondary communication node to request establishing the second connection between the mobile device and the second secondary communication node. The method includes receiving, at the master communication node, a third message from the mobile device confirming a configuration of the second connection between the mobile device and the second secondary communication node. The method includes receiving at the master communication node, a fourth message from the mobile device indicating a failure of the second connection between the mobile device and the second secondary communication node. The method further includes transmitting, from the master communication node, a fifth message to the first secondary communication node to report that the change from the first connection to the second connection is an improper change. The fifth message includes information identifying the first secondary communication node and the second secondary communication node.

In another representative aspect, a method for wireless communication is disclosed. The method includes transmitting, from a first secondary communication node, a first message to a master communication node to request a change from a first connection between a mobile device and the first secondary communication node to a second connection between the mobile device and a second secondary communication node. The first message includes information identifying the second secondary communication node. The method includes receiving, at the first secondary communication node, a second message from the master communication node confirming the change from the first connection to the second connection. The method includes receiving, at the first secondary communication node, a third message from the master communication node. The third message indicates a failure of the second connection between the mobile device and the second secondary communication node. The method further includes adjusting, by the first secondary communication node based on a determination that the change from the first connection to the second connection is an improper change, one or more thresholds to reduce connection changes to the second secondary communication node.

In another representative aspect, a method for wireless communication is disclosed. The method includes receiving, at the first secondary communication node, a first message from a master communication node. The first message indicates a failure of a first connection between a mobile device and the first secondary communication node. The method includes transmitting, from the first secondary communication node, a second message to the master communication node to request a change from the first connection between the mobile device and the first secondary communication node to a second connection between the mobile device and a second secondary communication node. The second message includes information identifying the second secondary communication node. The method includes receiving, at the first secondary communication node, a third message from the master communication node indicating a successful establishment of the second connection between the mobile device and the second secondary communication node. The third message includes information identifying the second secondary communication node and the mobile device. The method further includes adjusting, by the first secondary communication node based on a determination that the change from the first connection to the second connection is an improper change, one or more thresholds to increase connection changes to the second secondary communication node.

In another representative aspect, a wireless communication method is disclosed. The method includes transmitting, from a first secondary communication node, a first message to a master communication node to request a first change from a first connection between a mobile device and the first secondary communication node to a second connection between the mobile device and a second secondary communication node. The first message includes information identifying the second secondary communication node. The method also includes receiving, at the first secondary communication node, a second message from the master communication node confirming the change from the first connection to the second connection; receiving, at the first secondary communication node, a third message from the master communication node to request a second change from the second connection between the mobile device and the second secondary communication node to a third connection between the mobile device and the first secondary communication node; and adjusting, by the first secondary communication node based on a determination that the first change or the second change is an improper change, one or more thresholds to reduce or increase connection changes between the first secondary communication node and the second secondary communication node.

In another representative aspect, a wireless communications apparatus comprising a processor is disclosed. The processor is configured to implement a method described herein.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Figure 1:
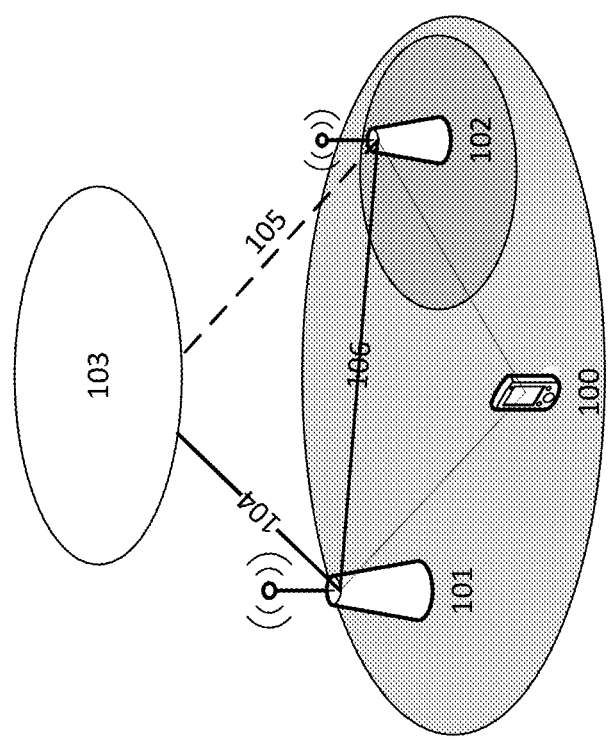
FIG. 1 shows an exemplary schematic diagram of a system architecture for Dual Connectivity (DC).

As NR emerges in the wireless market, wireless services using the current or legacy wireless connectivity protocol (e.g., Long Term Evolution LTE or another 4G wireless protocol) may still be available at the same time. Therefore, UEs capable of supporting both the NR protocol and a current (or legacy) protocol may be deployed. FIG. 1 shows an exemplary schematic diagram of a system architecture for Dual Connectivity (DC). The current base station (referred to as the first network element 101) in the core network 103 may select a suitable base station for the UE 100 to function as the second network element 102. For example, the suitable based station can be selected by comparing the channel quality of the base station with a predetermined threshold. Both base stations can provide radio resources to the UE 100 for data transmission on the user plane. On the wired interface side, the first network element 101 and the core network 103 establish a control plane interface 104 for the UE 100. The second network element 102 and the core network 103 may establish a user plane interface 105 for the UE 100. An interface 106 (e.g., Xn interface) inter-connects the two network elements. On the wireless interface side, the first and the second network elements (101 and 102) may provide radio resources using the same or different Radio Access Technologies (RATs). Each of the network element can schedule transmissions with the UE 100 independently. The network element that has a control plane connection to the core network is referred to as the master node (MN), such as the first network element 101. The network element that has only a user plane connection with the core network is referred to as the secondary node (SN) (e.g., the second network element 102). In some cases, the UE 100 can be connected to more than two nodes, with one node acting as the master node and the remaining acting as the secondary nodes.

In some embodiments, a UE can support a LTE-NR dual connection (DC). For example, one of the typical LTE-NR dual connectivity architectures can be set up as follows: the master node is an LTE RAN node (e.g., eNB) and the secondary node is an NR RAN node (e.g., gNB). The eNB and the gNB are simultaneously connected the Evolved Packet Core (EPC) network (e.g., LTE core network). The architecture shown in FIG. 1 can also be modified to include various master/secondary node configurations. For example, a NR RAN node can be the master node and the LTE RAN node can be the secondary node. In such case, the core network for the master NR RAN node is a Next Generation Converged Network (NG-CN).

In Dual Connectivity cases, the master node provides main control of the UE's communication. In some embodiments, the secondary node (e.g., gNB) can also provide some control functionalities. For example, the secondary node may initiate a secondary communication node change request (e.g., a SN Change Required) and transmit such request to the master node. In such cases, it is desirable to address the robustness issues (sometimes also called Mobility Robustness Optimization) for the secondary communication node. In particular, it is desirable to avoid or minimize SN changes that are improper, such as SN changes that are too early or too late.

The present document describes techniques that can be used in various embodiments to handle communication node changes either by a master communication node or by a secondary communication node. The disclosed techniques can be used to collect statistics regarding improper communication node changes to allow the master communication node or the secondary communication node to make better future decisions for communication node changes. In some embodiments, e.g., embodiments generally following the 5G architecture, the master communication node can be the master node (MN) used in the 5G standards. Similarly, in some embodiments, the secondary communication node can be the secondary node (SN) used in the 5G standards.

Figure 2:
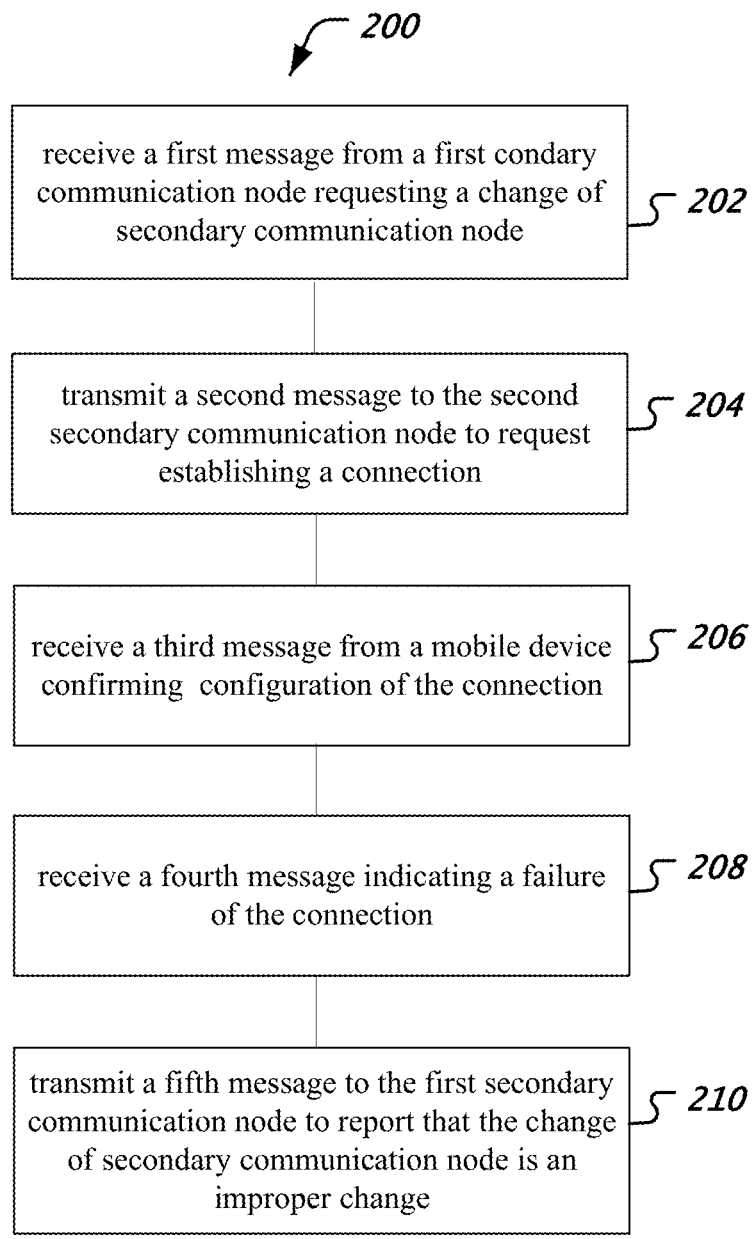
FIG. 2 is a flow chart representation of a method for wireless communication that can be implemented at a master communication node.

FIG. 2 is a flow chart representation of a method 200 for wireless communication that can be implemented at a master communication node. The method 200 includes, at 202, receiving, at a master communication node, a first message from a first secondary communication node requesting a change from a first connection between a mobile device and the first secondary communication node to a second connection between the mobile device and a second secondary communication node. The first message includes information identifying the second secondary communication node. The method 200 includes, at 204, transmitting, from the master communication node, a second message to the second secondary communication node to request establishing the second connection between the mobile device and the second secondary communication node. The method 200 includes, at 206, receiving, at the master communication node, a third message from the mobile device confirming a configuration of the second connection between the mobile device and the second secondary communication node. The method 200 includes, at 208, receiving at the master communication node, a fourth message from the mobile device indicating a failure of the second connection between the mobile device and the second secondary communication node. The method 200 further includes, at 210, transmitting, from the master communication node, a fifth message to the first secondary communication node to report that the change from the first connection to the second connection is an improper change. The fifth message includes information identifying the first secondary communication node and the second secondary communication node.

In some embodiments, the method 200 includes determining, by the master communication node, to change from the second connection between the mobile device and the second secondary communication node to a third connection between the mobile device and a third secondary communication node. In some implementations, the determining to change from the second connection to the third connection includes receiving, at the master communication node, a sixth message from the second secondary communication node. The sixth message requests to change the second connection to the third connection, wherein the sixth message includes information identifying the third secondary communication node. In some implementations, the determining to change from the second connection to the third connection includes identifying, by the master communication node, based on measurement results included in the fourth message, the third secondary communication node to be used for establishing the third connection.

In some embodiments, the method 200 includes transmitting, from the master communication node, a seventh message to the third secondary communication node to establish the third connection between the mobile device and the third secondary communication node.

In some embodiments, the master communication node indicates the improper change from the first connection to the second connection using one of the following types of reason codes: Wrong Secondary Node Change, Too Early Secondary Node Change, Too Late Secondary Node Change, or Ping-Pong Secondary Node Change. In some implementations, the master communication node indicates the improper change from the first connection to the second connection with a Wrong Secondary Node Change reason code to indicate that the master communication node expected the first secondary communication node to request a change from the first connection to the third connection. In some embodiments, the reason codes may be signaled as numbers based on a pre-configured mapping (e.g., binary numbers 000, 001, 010, etc. mapped to the various human readable reason codes).

In some embodiments, the fifth message causes the first secondary communication node to adjust one or more thresholds to reduce connection changes to the second secondary communication node and increase connection changes to the third secondary communication node.

Figure 3A:
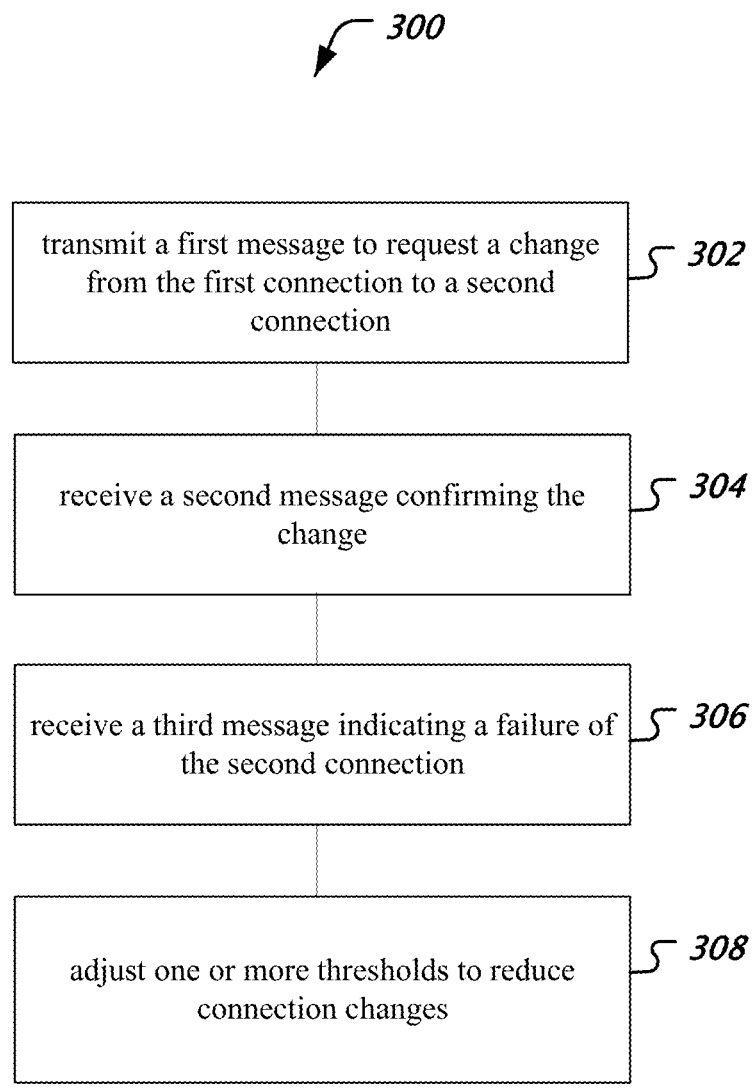
FIG. 3A is a flow chart representation of a method for wireless communication that can be implemented at a secondary communication node.

FIG. 3A is a flow chart representation of a method 300 for wireless communication that can be implemented at a secondary communication node. The method 300 includes, at 302, transmitting, from a first secondary communication node, a first message to a master communication node to request a change from a first connection between a mobile device and the first secondary communication node to a second connection between the mobile device and a second secondary communication node. The first message includes information identifying the second secondary communication node. The method 300 includes, at 304, receiving, at the first secondary communication node, a second message from the master communication node confirming the change from the first connection to the second connection. The method 300 includes, at 306, receiving, at the first secondary communication node, a third message from indicating a failure of the second connection between the mobile device and the second secondary communication node. The method 300 further includes, at 308, adjusting, by the first secondary communication node based on a determination that the change from the first connection to the second connection is an improper change, one or more thresholds to reduce connection changes to the second secondary communication node.

In some embodiments, the third message is received from the second secondary communication node, the third message including information for reporting that the change from the first connection to the second connection is an improper change.

In some embodiments, the third message is received from the master communication node. The method further includes transmitting, from the first secondary communication node prior to adjusting the one or more thresholds, a fourth message to the second secondary communication node indicating the failure of the second connection between the mobile device and the secondary communication node; and receiving, at the first secondary communication node, a fifth message from the second secondary communication node reporting that the change from the first connection to the second connection is an improper change.

In some embodiments, the determination of the improper change is made by the second secondary communication node. In some embodiments, the determination of the improper change is made by the first secondary communication node based on the first message, the second message, and the third message.

In some embodiments, the improper change from the first connection to the second connection is indicated using one of the following types of reason codes: Wrong Secondary Node Change, Too Early Secondary Node Change, Too Late Secondary Node Change, or Ping-Pong Secondary Node Change.

In some embodiments, the third message includes a request to establish a third connection between the mobile device and the first secondary communication node. The improper change from the first connection to the second connection is indicated using a Too Early Secondary Node Change reason code.

In some embodiments, the third message identifies a third secondary communication node to be used for establishing a third connection between the mobile device and the third secondary communication node. The improper change from the first connection to the second connection is indicated using a Wrong Secondary Node Change reason code.

Figure 3B:
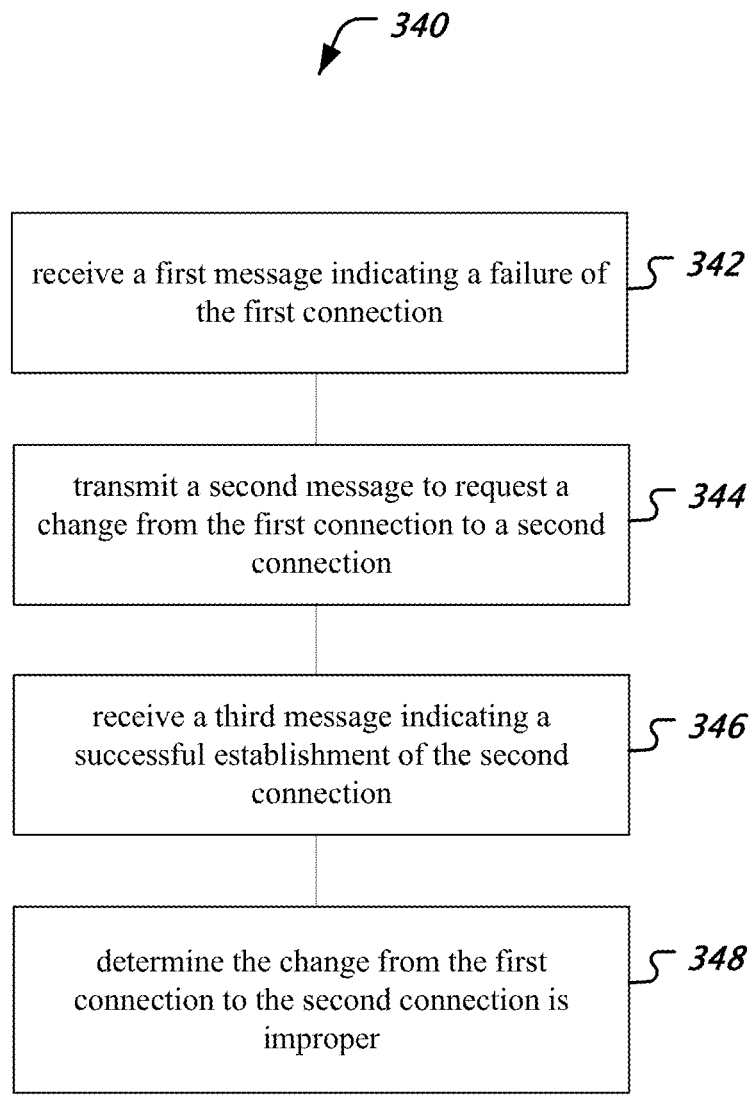
FIG. 3B is a flow chart representation of another method for wireless communication that can be implemented at a secondary communication node.

FIG. 3B is a flow chart representation of a method 340 for wireless communication that can be implemented at a secondary communication node. The method 340 includes, at 342, receiving, at the first secondary communication node, a first message indicating a failure of a first connection between a mobile device and the first secondary communication node. The method 340 includes, at 344, transmitting, from the first secondary communication node, a second message to the master communication node to request a change from the first connection between the mobile device and the first secondary communication node to a second connection between the mobile device and a second secondary communication node. The second message includes information identifying the second secondary communication node. The method 340 includes, at 346, receiving, at the first secondary communication node, a third message from the master communication node indicating a successful establishment of the second connection between the mobile device and the second secondary communication node. The third message includes information identifying the second secondary communication node and the mobile device. The method 340 further includes, at 348, adjusting, by the first secondary communication node based on a determination that the change from the first connection to the second connection is an improper change, one or more thresholds to increase connection changes to the second secondary communication node.

In some embodiments, the determination of the improper change is made based on the first message, the second message, and the third message. In some embodiments, transmitting the second message to the master communication node is performed prior to receiving the first message from the master communication node.

In some embodiments, the improper change from the first connection to the second connection is indicated using one of the following types of reason codes: Wrong Secondary Node Change, Too Early Secondary Node Change, Too Late Secondary Node Change, or Ping-Pong Secondary Node Change. In some implementations, the improper change from the first connection to the second connection is indicated using a Too Late Secondary Node Change reason code.

Figure 3C:
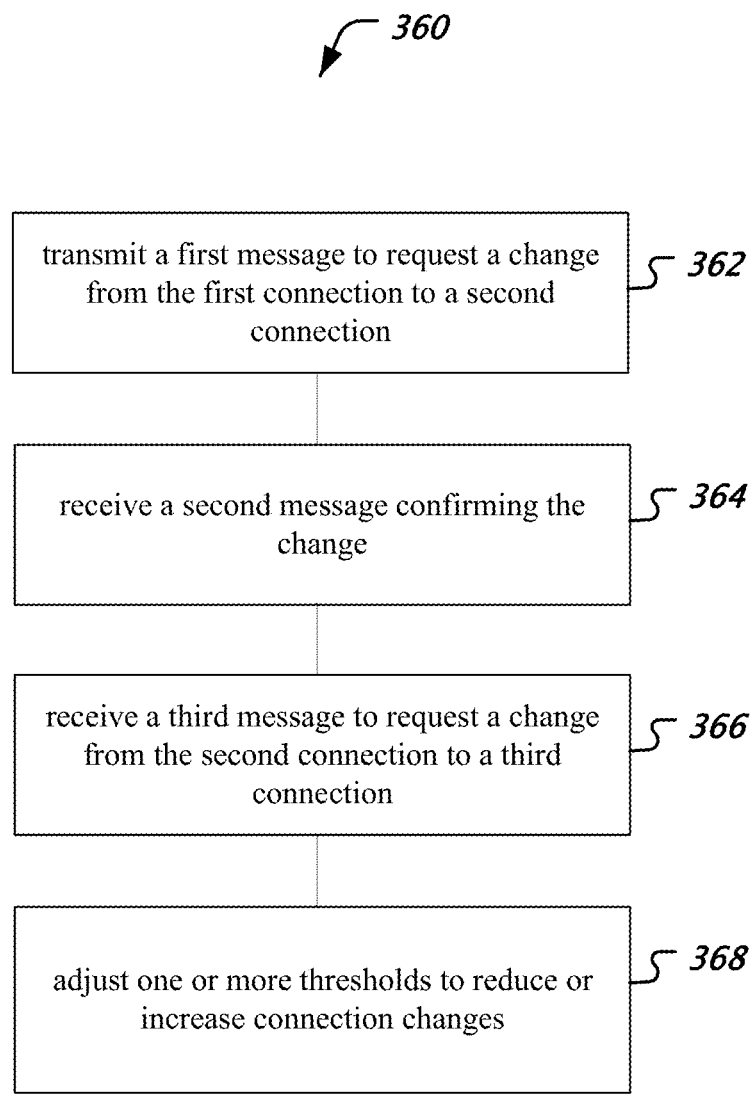
FIG. 3C is a flow chart representation of yet another method for wireless communication that can be implemented at a secondary communication node.

FIG. 3C is a flow chart representation of a method 360 for wireless communication that can be implemented at a secondary communication node. The method 360 includes, at 362, transmitting, from a first secondary communication node, a first message to a master communication node to request a first change from a first connection between a mobile device and the first secondary communication node to a second connection between the mobile device and a second secondary communication node. The first message includes information identifying the second secondary communication node. The method 360 includes, at 364, receiving, at the first secondary communication node, a second message from the master communication node confirming the change from the first connection to the second connection. The method 360 includes, at 366, receiving, at the first secondary communication node, a third message from the master communication node to request a second change from the second connection between the mobile device and the second secondary communication node to a third connection between the mobile device and the first secondary communication node. The method further includes, at 368, adjusting, by the first secondary communication node based on a determination that the first change or the second change is an improper change, one or more thresholds to reduce or increase connection changes between the first secondary communication node and the second secondary communication node.

In some embodiments, the improper change from the first connection to the second connection is indicated using one of the following types of reason codes: Wrong Secondary Node Change, Too Early Secondary Node Change, Too Late Secondary Node Change, or Ping-Pong Secondary Node Change. For example, the improper change from the first connection to the second connection is indicated using a Ping-Pong Secondary Node Change reason code.

Figure 4A:
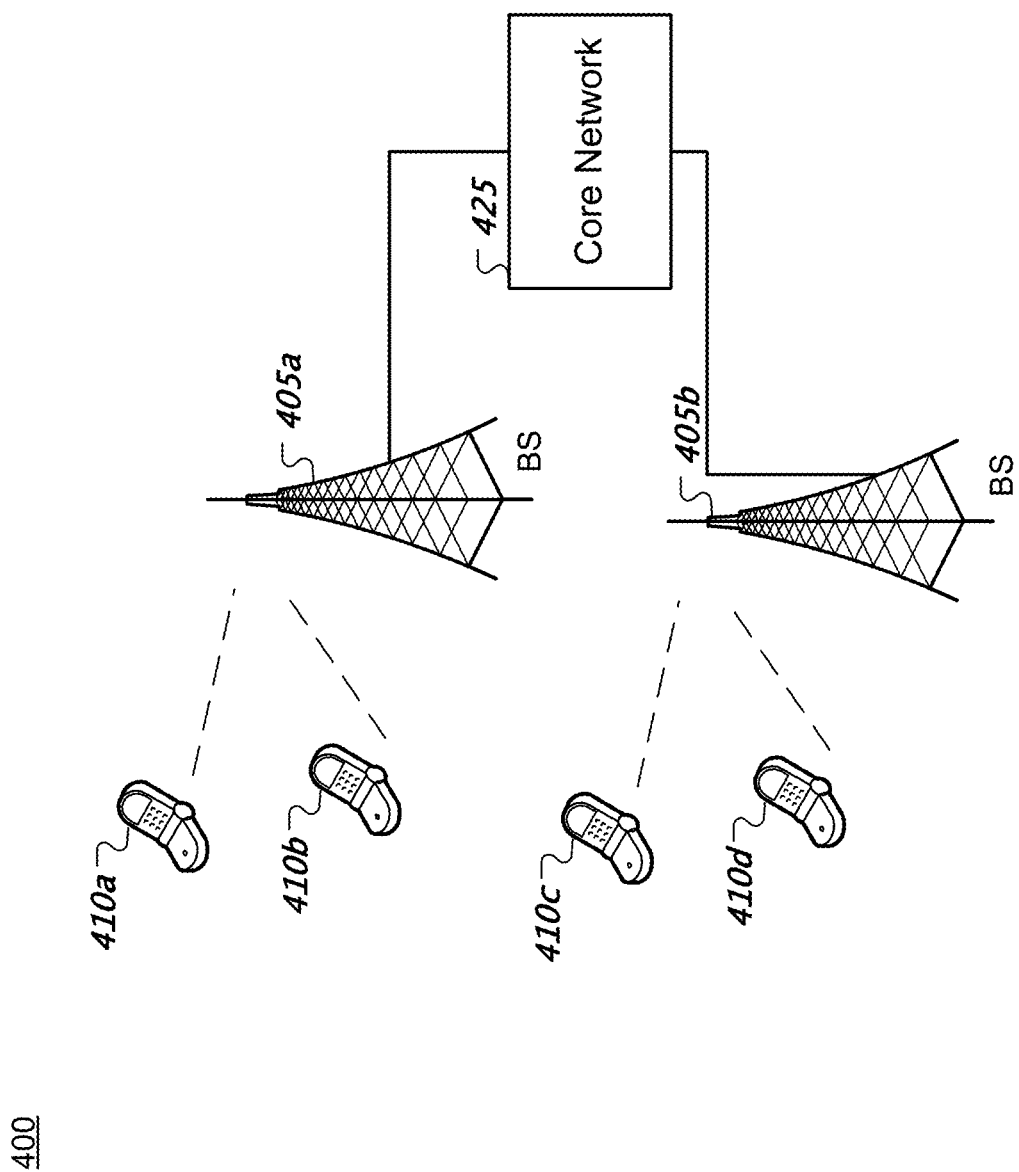
FIG. 4A shows an example of a wireless communication system where techniques in accordance with one or more embodiments of the present technology can be applied.

FIG. 4A shows an example of a wireless communication system 400 where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 4B:
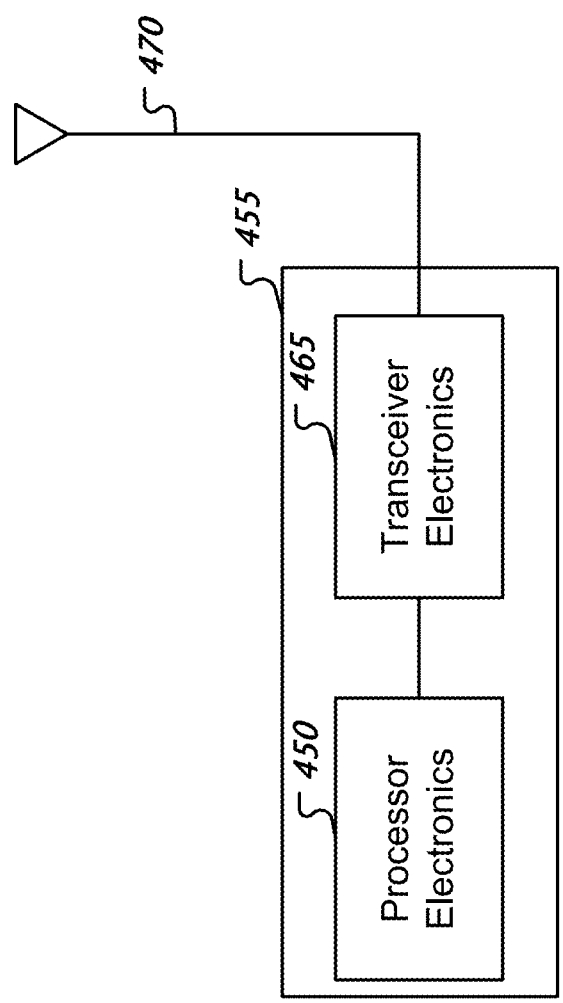
FIG. 4B is a block diagram representation of a portion of a radio station.

FIG. 4B is a block diagram representation of a portion of a radio station. A radio station 455 such as a base station or a wireless device (or UE) can include processor electronics 450 such as a microprocessor that implements one or more of the wireless techniques presented in this document. The radio station 455 can include transceiver electronics 465 to send and/or receive wireless signals over one or more communication interfaces such as antenna 470. The radio station 455 can include other communication interfaces for transmitting and receiving data. Radio station 455 can include one or more memories (not explicitly shown) configured to store information such as data and/or instructions. In some implementations, the processor electronics 450 can include at least a portion of the transceiver electronics 465. In some embodiments, at least some of the disclosed techniques, modules or functions are implemented using the radio station 455.

Details of the disclosed techniques are described in the following embodiments.

Example Embodiment 1

Figure 5:
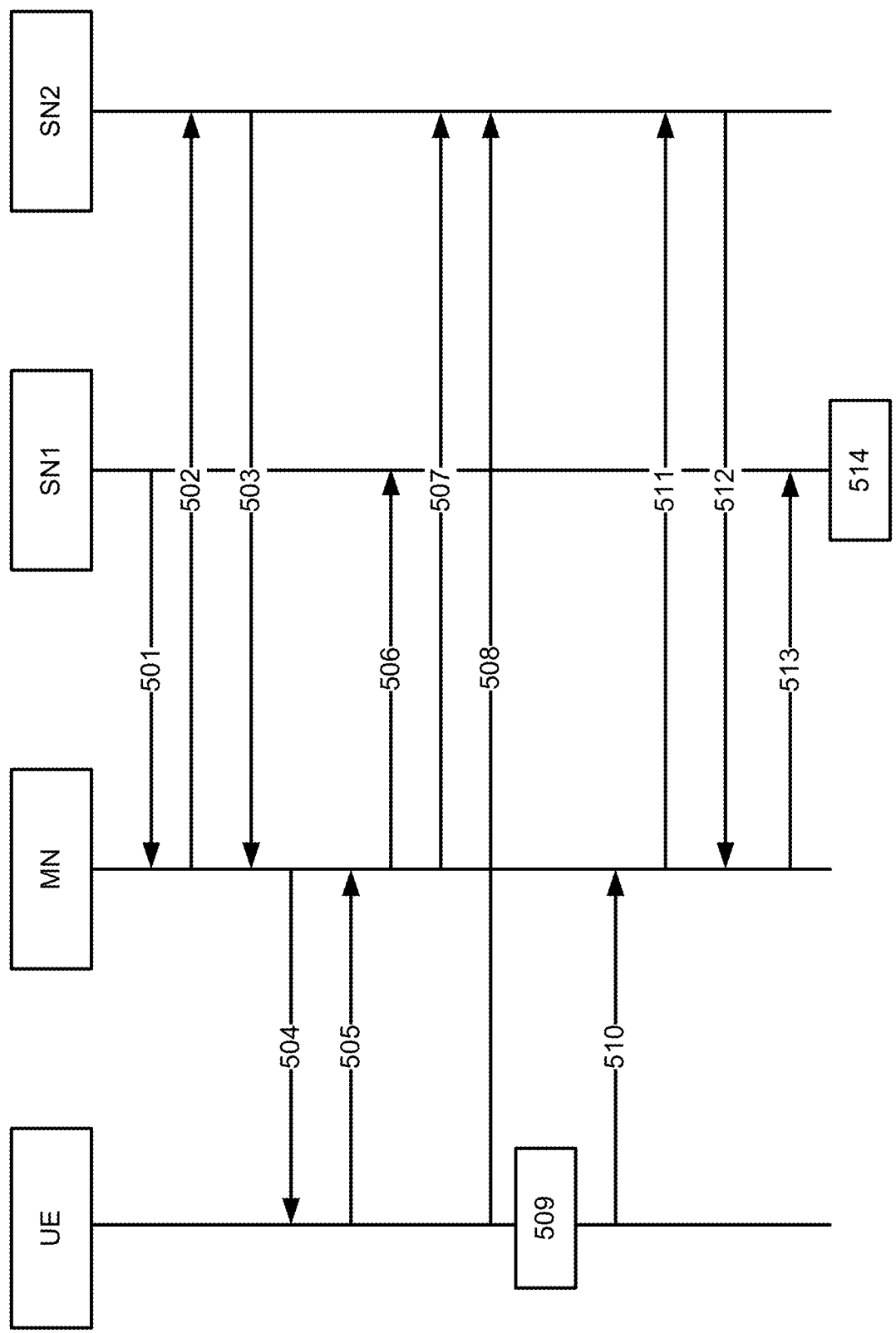
FIG. 5 shows a representative signaling procedure between the User Equipment (UE), the master node (MN), and the secondary nodes (SNs) for an SN change.

FIG. 5 shows a representative signaling procedure between the UE, the MN, and the secondary nodes (e.g., SN1 and SN2) for an SN change.

Step 1.1: The UE is dual-connected with the master node and secondary node 1 (SN1). The UE's primary serving cell provided by SN1 is Cell1. SN1 finds that SN2 provides a more suitable cell (e.g., Cell2). Thus, SN1 transmits, at 501, a message to the MN to request SN change (e.g., SN Change Required). The message can carry information that identifies Cell 2 provided by the SN2.

Step 1.2: The MN transmits, at 502, a message (e.g., SN Addition Request) to the SN2 to request adding the SN2 as a secondary node to the UE. The message can carry information that identifies Cell 2.

Step 1.3: The SN2 transmits, at 503, a message (e.g., SN Addition Request Acknowledge) to the MN to acknowledge the request to add the SN2 as a secondary node.

Step 1.4: The MN transmits, at 504, a message (e.g., a radio resource control (RRC) Reconfiguration) to the UE to reconfigure the connection between UE and SN2.

Step 1.5: The UE transmits, at 505, a message (e.g., an RRC Reconfiguration Complete) to indicate that the reconfiguration has completed.

Step 1.6: The MN transmits, at 506, a message (e.g., SN Change Confirm) to the SN1 to confirm the SN change.

Step 1.7: The MN transmits, at 507, a message (e.g., SN Reconfiguration Complete) to the SN2 to indicate that reconfiguration of the secondary node is completed.

Step 1.8: The UE now gains access, at 508, to Cell2 provided by the SN2.

Step 1.9: A Radio Link Failure (RLF) occurs, at 509, in Cell2.

Step 1.10: The UE transmits, at 510, a message (e.g., SN Failure Information) to the MN to indicate the failure information. The information may include indicator(s) to indicate that an RLF has occurred in Cell2. The information may also include measurement results for both Cell 1 and Cell 2 from the UE.

Step 1.11: The MN forwards, at 511, the failure information in a message (e.g., SN Failure Information) to the SN2.

Step 1.12: Based on the message (e.g., SN Failure Information), the SN2 determines that an RLF has occurred in Cell2. In some embodiments, based on the measurement results in the message, the SN2 can determine that Cell1 provided by SN1 is a more suitable cell for the UE. The SN2 then transmits, at 512, a message (e.g., SN Change Required) to the MN to request a change of SN. The message can include information identifying the cell in which the RLF has occurred (e.g., Cell2).

Step 1.13: The MN transmits, at 513, a message (e.g., SN Addition Request) to the SN1. The message can include information identifying both Cell1 provided by the SN1 and/or Cell 2 in which the RLF has occurred.

Step 1.14: The SN1 now can determine that an SN change from SN1 to SN2 was successful, but an RLF happened in SN2 right away. Based on information in the message (e.g., SN Addition Request), the SN1 can determine that the SN change to SN2 was too early (also known as Too Early SN Change).

Step 1.15: The SN1 can accumulate statistics for improper SN changes such as Too Early SN Changes and other types of improper SN changes. The SN1 then can adjust one or more thresholds to trigger SN change to SN2 based on the accumulated statistics. For example, when Too Early SN Changes happen too often, the adjusted thresholds can reduce the number of SN changes from SN1 to SN2.

Example Embodiment 2

Figure 6:
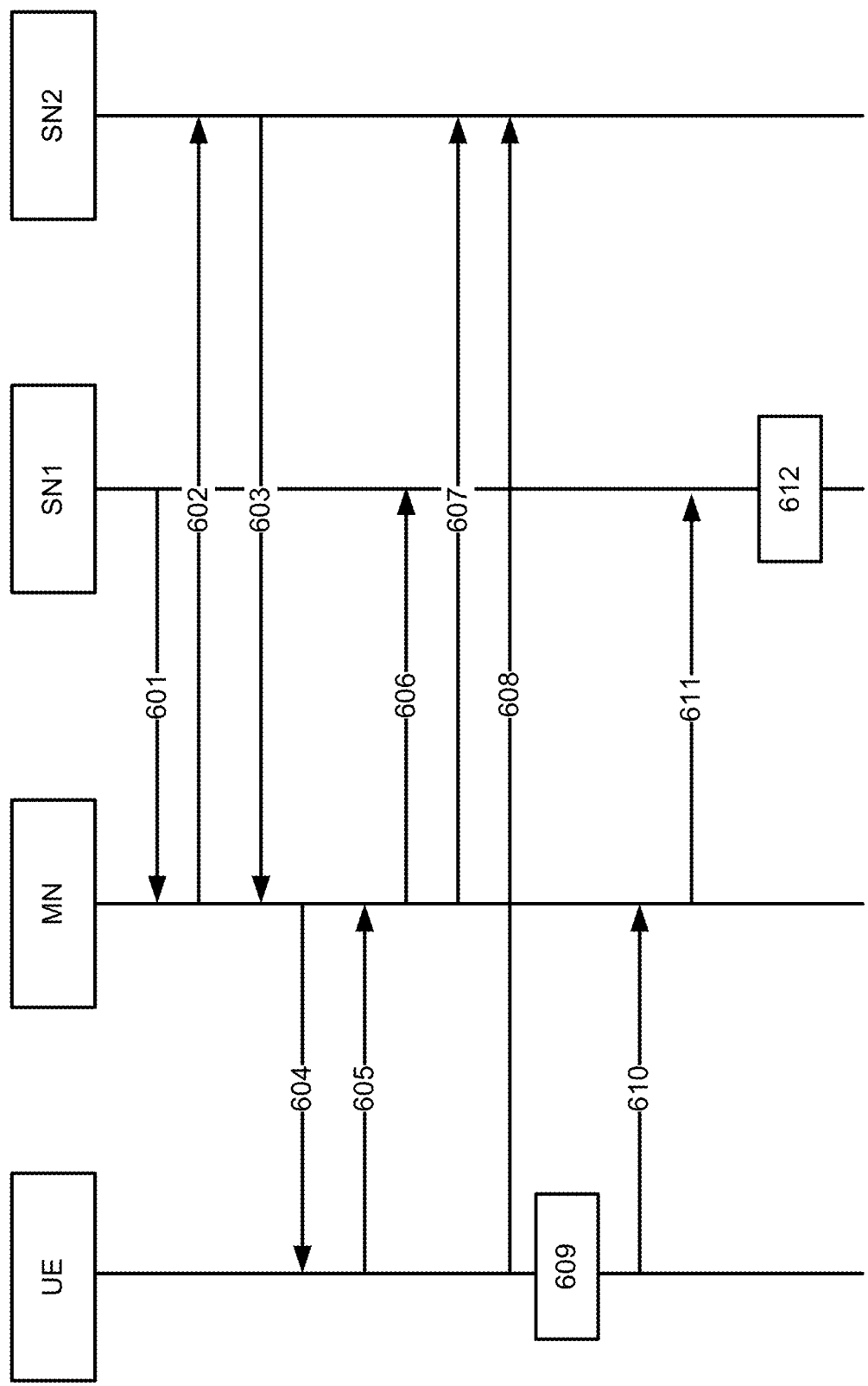
FIG. 6 shows another representative signaling procedure between the UE, the MN, and the SNs for an SN change.

FIG. 6 shows another representative signaling procedure between the UE, the MN, and the SNs (e.g., SN1 and SN2) for a SN change.

Step 2.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 601, a message to the MN to request SN change (e.g., SN Change Required). The message can carry information that identifies Cell 2 provided by the SN2.

Step 2.2: The MN transmits, at 602, a message (e.g., SN Addition Request) to the SN2 to request adding the SN2 as a secondary node to the UE. The message can carry information that identifies Cell 2.

Step 2.3: The SN2 transmits, at 603, a message (e.g., SN Addition Request Acknowledge) to the MN to acknowledge the request to add the SN2 as a secondary node.

Step 2.4: The MN transmits, at 604, a message (e.g., an RRC Reconfiguration) to the UE to reconfigure the connection between UE and SN2.

Step 2.5: The UE transmits, at 605, a message (e.g., an RRC Reconfiguration Complete) to indicate that the reconfiguration has completed.

Step 2.6: The MN transmits, at 606, a message (e.g., SN Change Confirm) to the SN1 to confirm the SN change.

Step 2.7: The MN transmits, at 607, a message (e.g., SN Reconfiguration Complete) to the SN2 to indicate that reconfiguration of the secondary node is completed.

Step 2.8: The UE now gains access, at 608, to Cell 2 in SN2.

Step 2.9: A Radio Link Failure (RLF) occurs, at 609, in Cell 2.

Step 2.10: The UE transmits, at 610, a message (e.g., SN Failure Information) to the MN to indicate the failure information. The information may include indicator(s) to indicate that an RLF has occurred in Cell 2. The information may also include measurement results for both Cell 1 and Cell 2 from the UE.

Step 2.11: Based on the message (e.g., SN Failure Information), the MN determines that an RLF has occurred in Cell2. In some embodiments, based on the measurement results in the message, the MN can determine that Cell1 provided by SN1 is a more suitable cell for the UE. The MN then transmits, at 611, a message (e.g., SN Change Required) to the SN1 to request a change of SN. The message can include information identifying the cell in which the RLF has occurred (e.g., Cell2).

Step 2.12: The SN1 now can determine, at 612, that an SN change from SN1 to SN2 was successful, but an RLF happened in SN2 right away. Based on information in the message (e.g., SN Addition Request), the SN1 can determine that the SN change to SN2 was too early (also known as Too Early SN Change).

Step 2.13: The SN1 can accumulate statistics for improper SN changes such as Too Early SN Changes and other types of improper SN changes. The SN1 then can adjust one or more thresholds to trigger SN change to SN2 based on the accumulated statistics. For example, when Too Early SN Changes happen too often, the adjusted thresholds can reduce the number of SN changes from SN1 to SN2. After the adjustment, connection changes from SN1 to SN2 can be triggered at a lower frequency than the current frequency of SN1 to SN2 changes.

Example Embodiment 3

Figure 7:
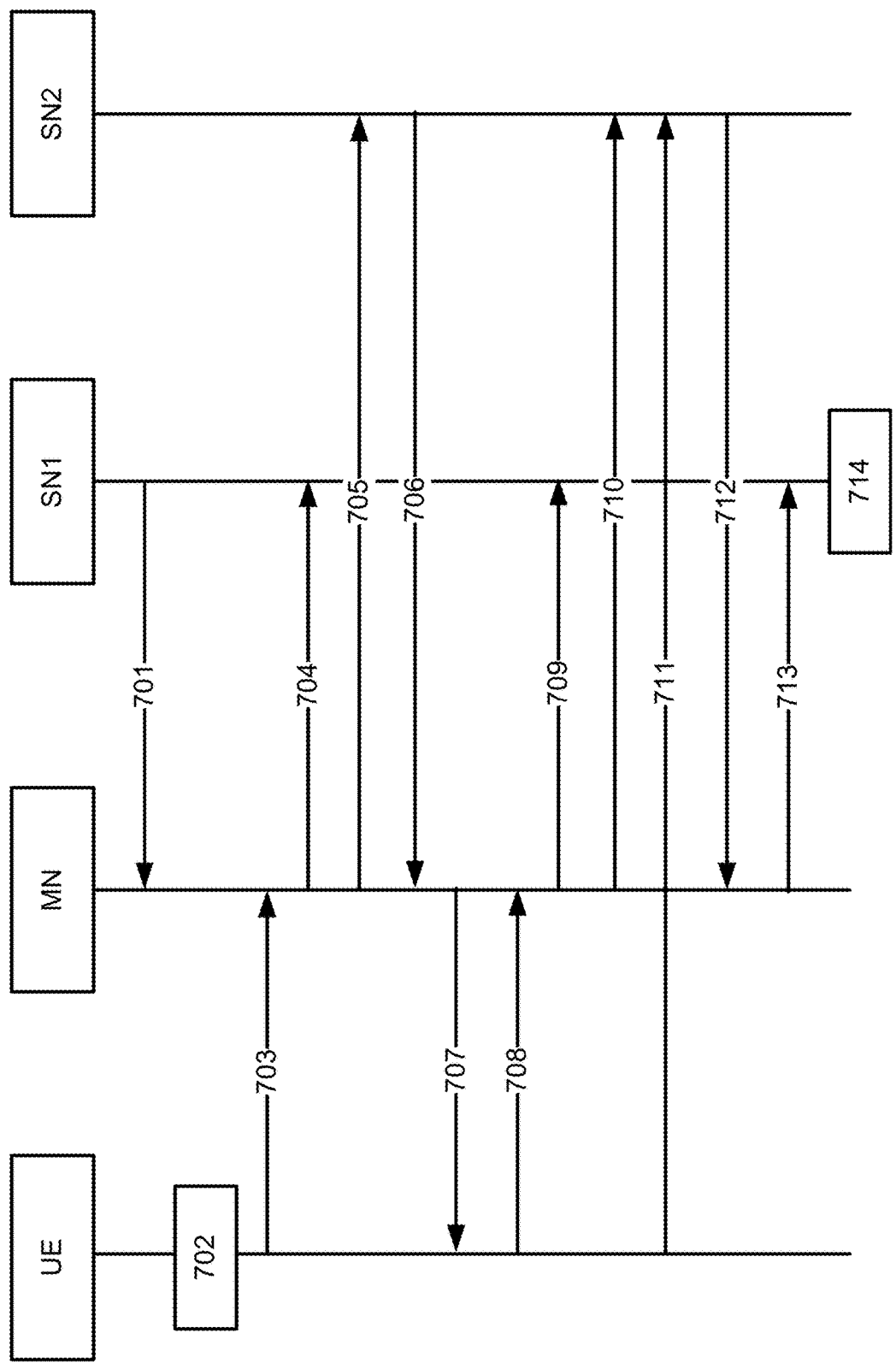
FIG. 7 shows another representative signaling procedure between the UE, the MN, and the SNs for an SN change.

FIG. 7 shows another representative signaling procedure between the UE, the MN, and the SNs (e.g., SN1 and SN2) for a SN change.

Step 3.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 701, a message to MN to request a SN change (e.g., SN Change Required). The message can carry information that identifies Cell2 provided by the SN2.

Step 3.2: A Radio Link Failure (RLF) occurs, at 702, in Cell 1.

Step 3.3: The UE transmits, at 703, a message (e.g., SN Failure Information) to the MN to indicate the failure information. The information may include indicator(s) to indicate that an RLF has occurred in Cell1. The information may also include measurement results for Cell1 from the UE.

Step 3.4: The MN forwards, at 704, the failure information in a message (e.g., SN Failure Information) to the SN1.

Step 3.5: The MN transmits, at 705, a message (e.g., SN Addition Request) to the SN2 to request adding the SN2 as a secondary node to the UE. The message can carry information that identifies Cell2.

Step 3.6: The SN2 transmits, at 706, a message (e.g., SN Addition Request Acknowledge) to the MN to acknowledge the request to add the SN2 as a secondary node.

Step 3.7: The MN transmits, at 707, a message (e.g., an RRC Reconfiguration) to the UE to reconfigure the connection between UE and SN2.

Step 3.8: The UE transmits, at 708, a message (e.g., an RRC Reconfiguration Complete) to indicate that the reconfiguration has completed.

Step 3.9: The MN transmits, at 709, a message (e.g., SN Change Confirm) to the SN1 to confirm the SN change.

Step 3.10: The MN transmits, at 710, a message (e.g., SN Reconfiguration Complete) to the SN2 to indicate that reconfiguration of the secondary node is completed.

Step 3.11: The UE now gains access, at 711, to Cell 2.

Step 3.12: The SN2 transmits, at 712, a message (e.g., Access Success Indication) to the MN. The message indicates that the UE has gained access to the SN2 successfully. The message may include information identifying the UE and the cell to which the UE has gained access (e.g., Cell2).

Step 3.13: The MN forwards, at 713, the success indication (e.g., Access Success Indication) in a message to the SN1.

Step 3.14: Based on the message (e.g., Access Success Indication), the SN1 knows that an RLF occurred right after an SN change request was sent from SN1. A new connection to the SN2 was established successfully later. The SN1 then determines, at 714, that the SN change to SN2 was too late (also known as Too Late SN Change).

Step 3.15: The SN1 can accumulate statistics for improper SN changes such as Too Late SN Changes and other types of improper SN changes. The SN1 then can adjust one or more thresholds to trigger SN change to SN2 based on the accumulated statistics. For example, when Too Late SN Changes happen too often, the adjusted thresholds can increase the number of SN changes from SN1 to SN2.

Example Embodiment 4

Figure 8:
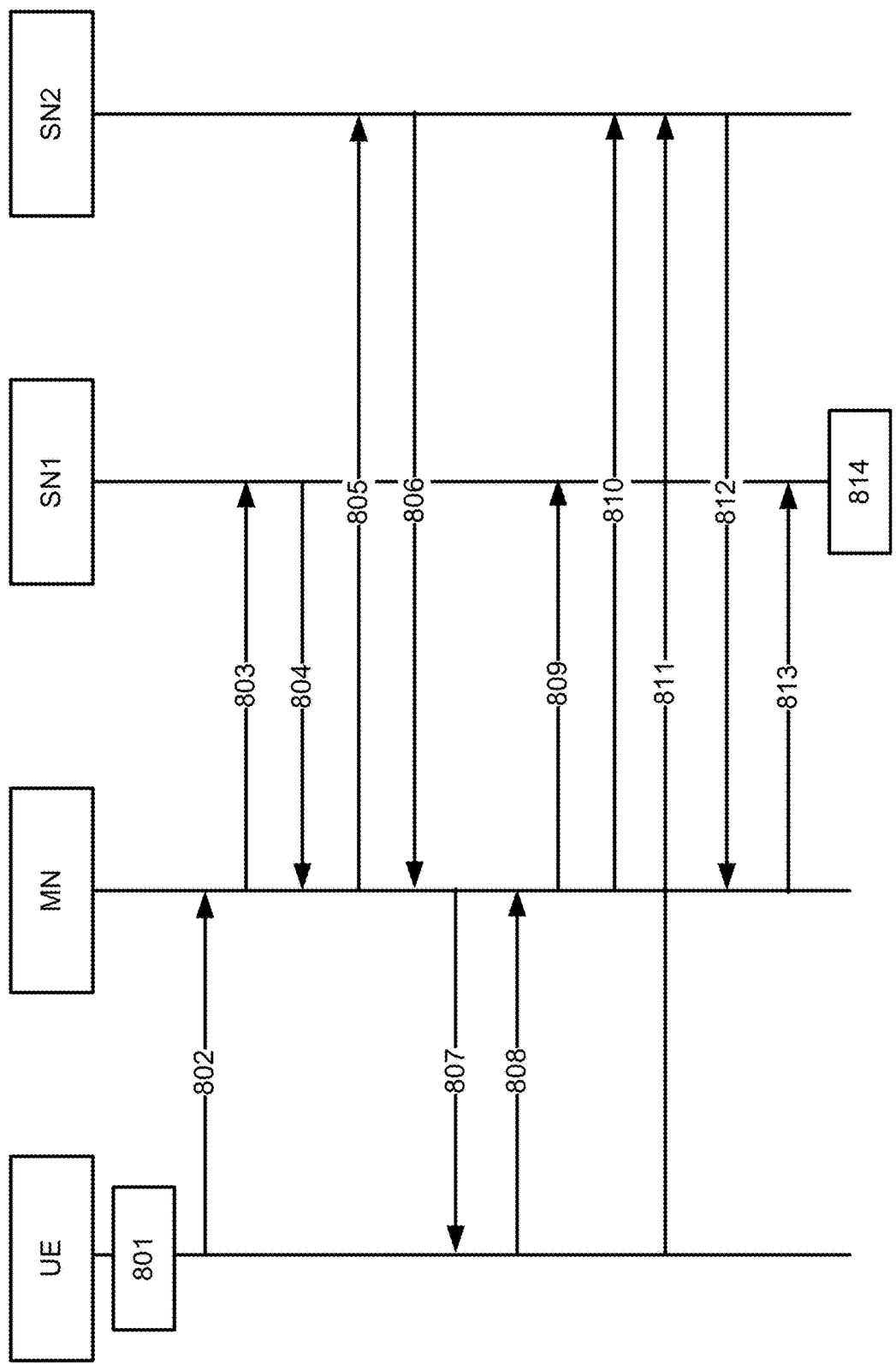
FIG. 8 shows another representative signaling procedure between the UE, the MN, and the SNs for an SN change.

FIG. 8 shows another representative signaling procedure between the UE, the MN, and the SNs (e.g., SN1 and SN2) for a SN change.

Step 4.1: The UE is dual-connected with the master node (MN) and secondary node 1 (SN1). The UE's primary serving cell provided by SN1 is Cell1. A Radio Link Failure (RLF) occurs, at 801, in Cell 1.

Step 4.2: The UE transmits, at 802, a message (e.g., SN Failure Information) to the MN to indicate the failure information. The information may include indicator(s) to indicate that an RLF has occurred in Cell 1. The information may also include measurement results for Cell 1 from the UE.

Step 4.3: The MN forwards, at 803, the failure information in a message (e.g., SN Failure Information) to the SN1.

Step 4.4: The SN1 finds that SN2 provides a more suitable cell (e.g., Cell2). Thus, SN1 transmits, at 804, a message to MN to request SN change (e.g., SN Change Required). The message can carry information that identifies Cell 2 provided by the SN2.

Step 4.5: The MN transmits, at 805, a message (e.g., SN Addition Request) to the SN2 to request adding the SN2 as a secondary node to the UE. The message can carry information that identifies Cell 2.

Step 4.6: The SN2 transmits, at 806, a message (e.g., SN Addition Request Acknowledge) to the MN to acknowledge the request to add the SN2 as a secondary node.

Step 4.7: The MN transmits, at 807, a message (e.g., an RRC Reconfiguration) to the UE to reconfigure the connection between UE and SN2.

Step 4.8: The UE transmits, at 808, a message (e.g., an RRC Reconfiguration Complete) to indicate that the reconfiguration has completed.

Step 4.9: The MN transmits, at 809, a message (e.g., SN Change Confirm) to the SN1 to confirm the SN change.

Step 4.10: The MN transmits, at 810, a message (e.g., SN Reconfiguration Complete) to the SN2 to indicate that reconfiguration of the secondary node is completed.

Step 4.11: The UE now gains access, at 811, to Cell 2.

Step 4.12: The SN2 transmits, at 812, a message (e.g., Access Success Indication) to the MN. The message indicates that the UE has gained access to the SN2 successfully. The message may include information identifying the UE and the cell to which the UE has gained access (e.g., Cell2).

Step 4.13: The MN forwards, at 813, the success indication (e.g., Access Success Indication) in a message to the SN1.

Step 4.14: Based on the message (e.g., Access Success Indication), the SN1 knows that an SN change request was sent from SN1 right after an RLF occurred. A new connection to the SN2 was established successfully later. The SN1 then determines, at 814, that the SN change to SN2 was too late (also known as Too Late SN Change).

Step 4.15: The SN1 can accumulate statistics for improper SN changes such as Too Late SN Changes and other types of improper SN changes. The SN1 then can adjust one or more thresholds to trigger SN change to SN2 based on the accumulated statistics. For example, when Too Late SN Changes happen too often, the adjusted thresholds can increase the number of SN changes from SN1 to SN2. After the adjustment, connection changes from SN1 to SN2 can be triggered at a higher frequency than the current frequency of SN1 to SN2 changes.

Example Embodiment 5

Figure 9:
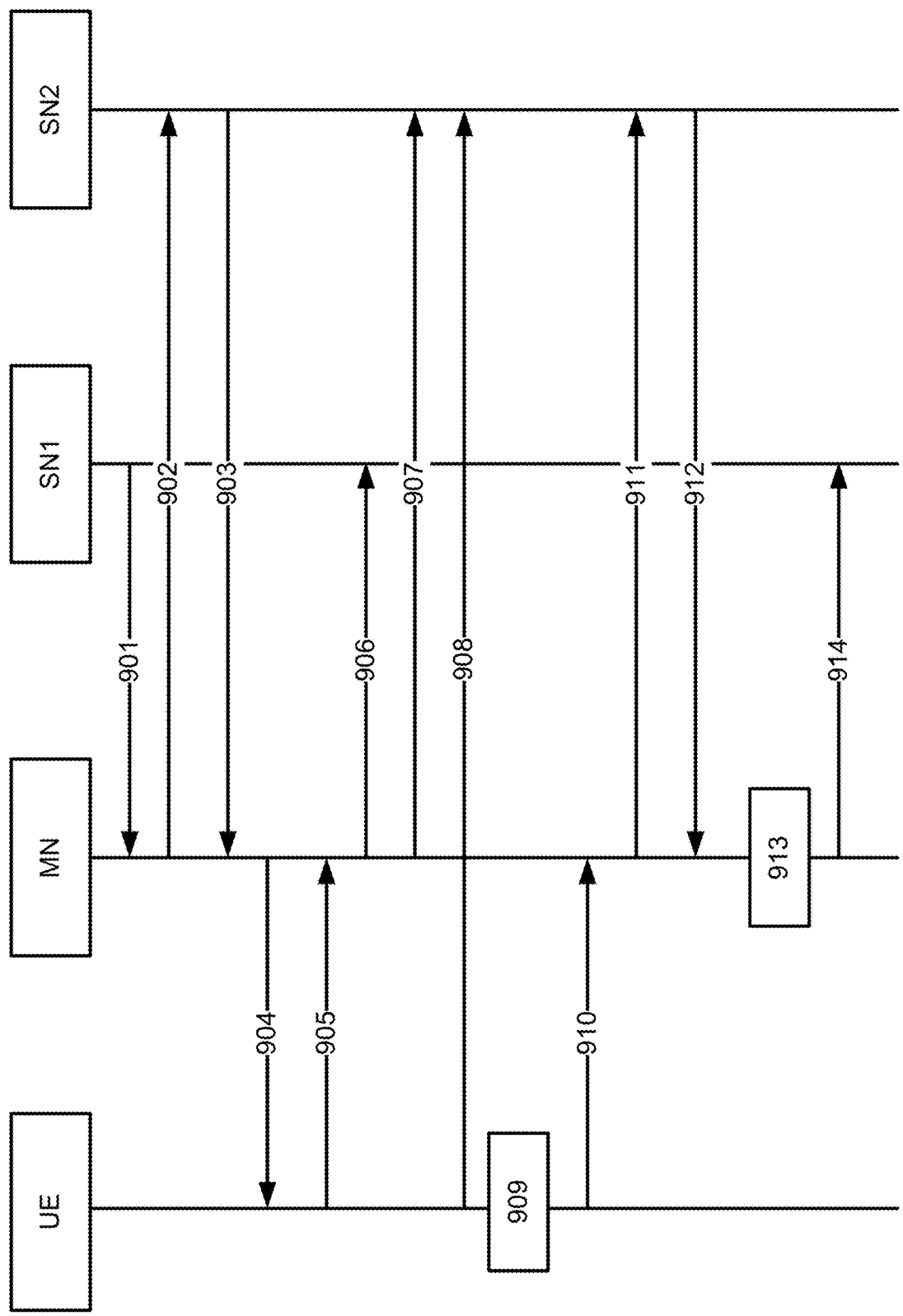
FIG. 9 shows another representative signaling procedure between the UE, the MN, and the SNs for an SN change.

FIG. 9 shows another representative signaling procedure between the UE, the MN, and the SNs (e.g., SN1 and SN2) for a SN change.

Step 5.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 901, a message to MN to request SN change (e.g., SN Change Required). The message can carry information that identifies Cell 2 provided by SN2.

Step 5.2: The MN transmits, at 902, a message (e.g., SN Addition Request) to the SN2 to request adding the SN2 as a secondary node to the UE. The message can carry information that identifies Cell 2.

Step 5.3: The SN2 transmits, at 903, a message (e.g., SN Addition Request Acknowledge) to the MN to acknowledge the request to add the SN2 as a secondary node.

Step 5.4: The MN transmits, at 904, a message (e.g., an RRC Reconfiguration) to the UE to reconfigure the connection between UE and SN2.

Step 5.5: The UE transmits, at 905, a message (e.g., an RRC Reconfiguration Complete) to indicate that the reconfiguration has completed.

Step 5.6: The MN transmits, at 906, a message (e.g., SN Change Confirm) to the SN1 to confirm the SN change.

Step 5.7: The MN transmits, at 907, a message (e.g., SN Reconfiguration Complete) to the SN2 to indicate that reconfiguration of the secondary node is completed.

Step 5.8: The UE now gains access, at 908, to Cell 2.

Step 5.9: A Radio Link Failure (RLF) occurs, at 909, in Cell 2.

Step 5.10: The UE transmits, at 910, a message (e.g., SN Failure Information) to the MN to indicate the failure information. The information may include indicator(s) to indicate that an RLF has occurred in Cell 2. The information may also include measurement results for both Cell 1 and Cell 2 from the UE.

Step 5.11: The MN forwards, at 911, the failure information in a message (e.g., SN Failure Information) to the SN2.

Step 5.12: Based on the message (e.g., SN Failure Information), the SN2 determines that an RLF has occurred in Cell2. In some embodiments, based on the measurement results in the message, the SN2 can determine that Cell3 provided by SN3 is a more suitable cell for the UE. The SN2 then transmits, at 912, a message (e.g., SN Change Required) to the MN to request a change of SN. The message can include information identifying Cell3.

Step 5.13: The MN now determines that an SN change from SN1 to SN2 was successful, but an RLF happened in SN2 right away. The MN is further informed that the change of SN to Cell 3 provided by SN3 is more suitable. Thus, the MN can determine, at 913, that the SN change to SN2 was a Wrong SN Change.

Step 5.14: The MN transmits, at 914, a message (e.g., SN Change Report) to the SN1 to report the change of SN. The message can carry information identifying the source cell (e.g., Cell1), the cell in which RLF has occurred (e.g., Cell2), and the target cell (e.g., Cell3). In some embodiments, the message can carry information regarding the RLF. In some implementations, the message can indicate that the SN change (e.g., the change from SN1 to SN2) was improper. For example, the improper SN change can be a Too Early SN Change, a Too Late SN Change, or a Wrong SN Change.

Step 5.15: The SN1 can accumulate statistics for improper SN changes such as a Wrong SN Changes and other types of improper SN changes. The SN1 then can adjust one or more thresholds to trigger SN change to SN2 and/or to SN3 based on the accumulated statistics. For example, when Wrong SN Changes from SN1 to SN2 happen too often, followed by SN changes to SN3, the thresholds can be adjusted to reduce the number of SN changes from SN1 to SN2 and/or to increase the number of SN changes from SN1 to SN3.

Example Embodiment 6

Figure 10:
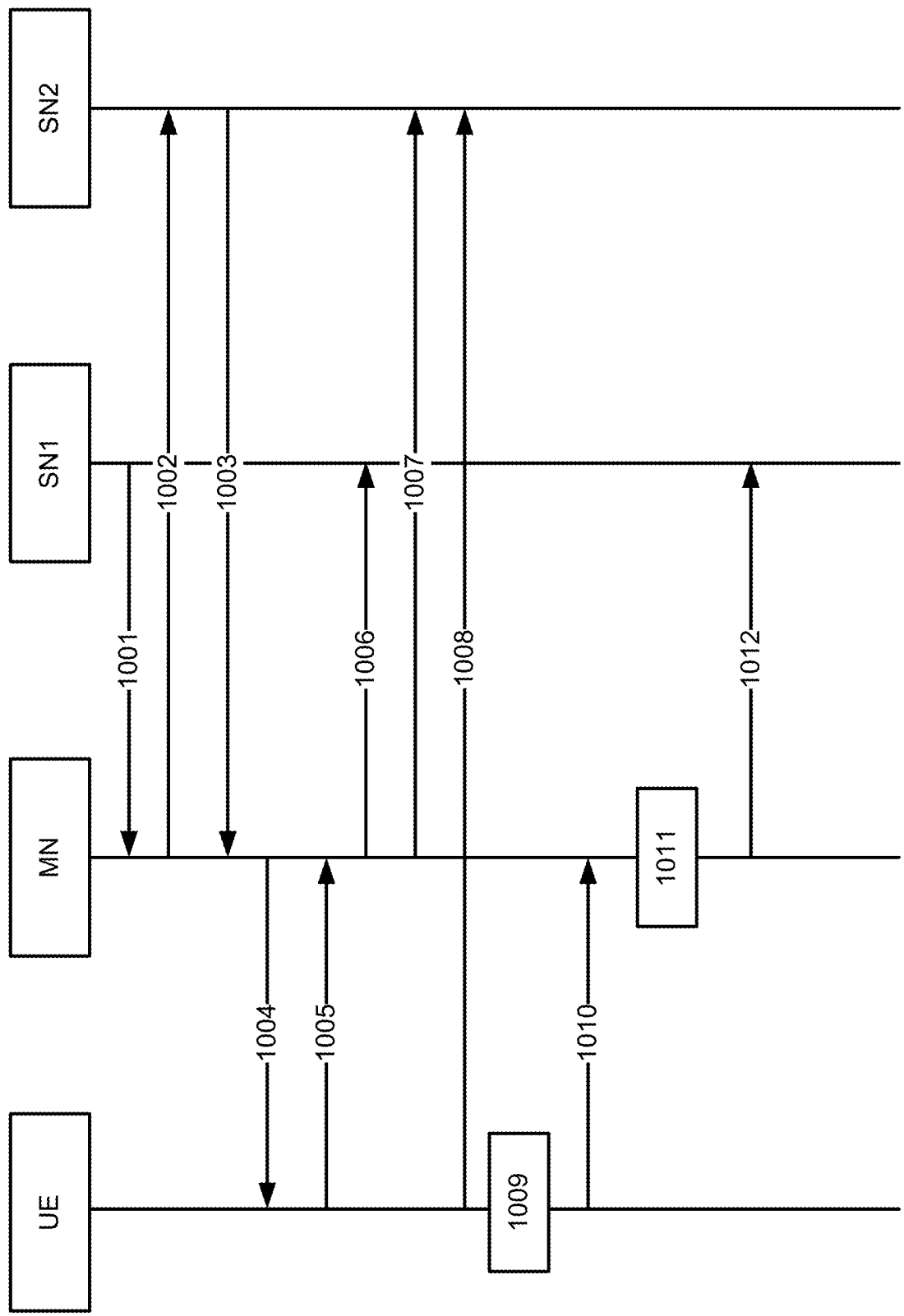
FIG. 10 shows another representative signaling procedure between the UE, the MN, and the SNs for an SN change.

FIG. 10 shows another representative signaling procedure between the UE, the MN, and the SNs (e.g., SN1 and SN2) for a SN change.

Step 6.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 1001, a message to MN to request SN change (e.g., SN Change Required). The message can carry information that identifies Cell 2 provided by SN2.

Step 6.2: The MN transmits, at 1002, a message (e.g., SN Addition Request) to the SN2 to request adding the SN2 as a secondary node to the UE. The message can carry information that identifies Cell 2.

Step 6.3: The SN2 transmits, at 1003, a message (e.g., SN Addition Request Acknowledge) to the MN to acknowledge the request to add the SN2 as a secondary node.

Step 6.4: The MN transmits, at 1004, a message (e.g., an RRC Reconfiguration) to the UE to reconfigure the connection between UE and SN2.

Step 6.5: The UE transmits, at 1005, a message (e.g., an RRC Reconfiguration Complete) to indicate that the reconfiguration has completed.

Step 6.6: The MN transmits, at 1006, a message (e.g., SN Change Confirm) to the SN1 to confirm the SN change.

Step 6.7: The MN transmits, at 1007, a message (e.g., SN Reconfiguration Complete) to the SN2 to indicate that reconfiguration of the secondary node is completed.

Step 6.8: The UE now gains access, at 1008, to Cell 2.

Step 6.9: A Radio Link Failure (RLF) occurs, at 1009, in Cell 2.

Step 6.10: The UE transmits, at 1010, a message (e.g., SN Failure Information) to the MN to indicate the failure information. The information may include indicator(s) to indicate that an RLF has occurred in Cell 2. The information may also include measurement results for both Cell 1 and Cell 2 from the UE.

Step 6.11: Based on the message (e.g., SN Failure Information), the MN determines that an RLF has occurred in Cell2. In some embodiments, based on the measurement results in the message, the MN can determine, at 1011, that Cell3 provided by SN3 is a more suitable cell for the UE.

Step 6.12: The MN then transmits, at 1012, a report (e.g., SN Change Report) to the SN1. The message can include information identifying the source cell (e.g., Cell1), the cell in which RLF has occurred (e.g., Cell2), and the target cell (e.g., Cell3). The message can also include information to indicate that the SN change (e.g., the change from SN1 to SN2) was improper. For example, the improper SN change can be a Too Early SN Change, a Too Late SN Change, or a Wrong SN Change.

Step 6.13: Based on the report (e.g., SN Change Report) from the MN, the SN1 can accumulate statistics for improper SN changes such as a Wrong SN Changes and other types of improper SN changes. The SN1 then can adjust one or more thresholds to trigger SN change to SN2 and/or to SN3 based on the accumulated statistics. For example, when Wrong SN Changes from SN1 to SN2 happen too often, followed by SN changes to SN3, the thresholds can be adjusted to reduce the number of SN changes from SN1 to SN2 and/or to increase the number of SN changes from SN1 to SN3. After the adjustment, connection changes from SN1 to SN2 can be triggered at a lower frequency than the current frequency of SN1 to SN2 changes while connection changes from SN1 to SN3 can be triggered at a higher frequency than the current frequency of SN1 to SN3 changes.

Example Embodiment 7

Figure 11:
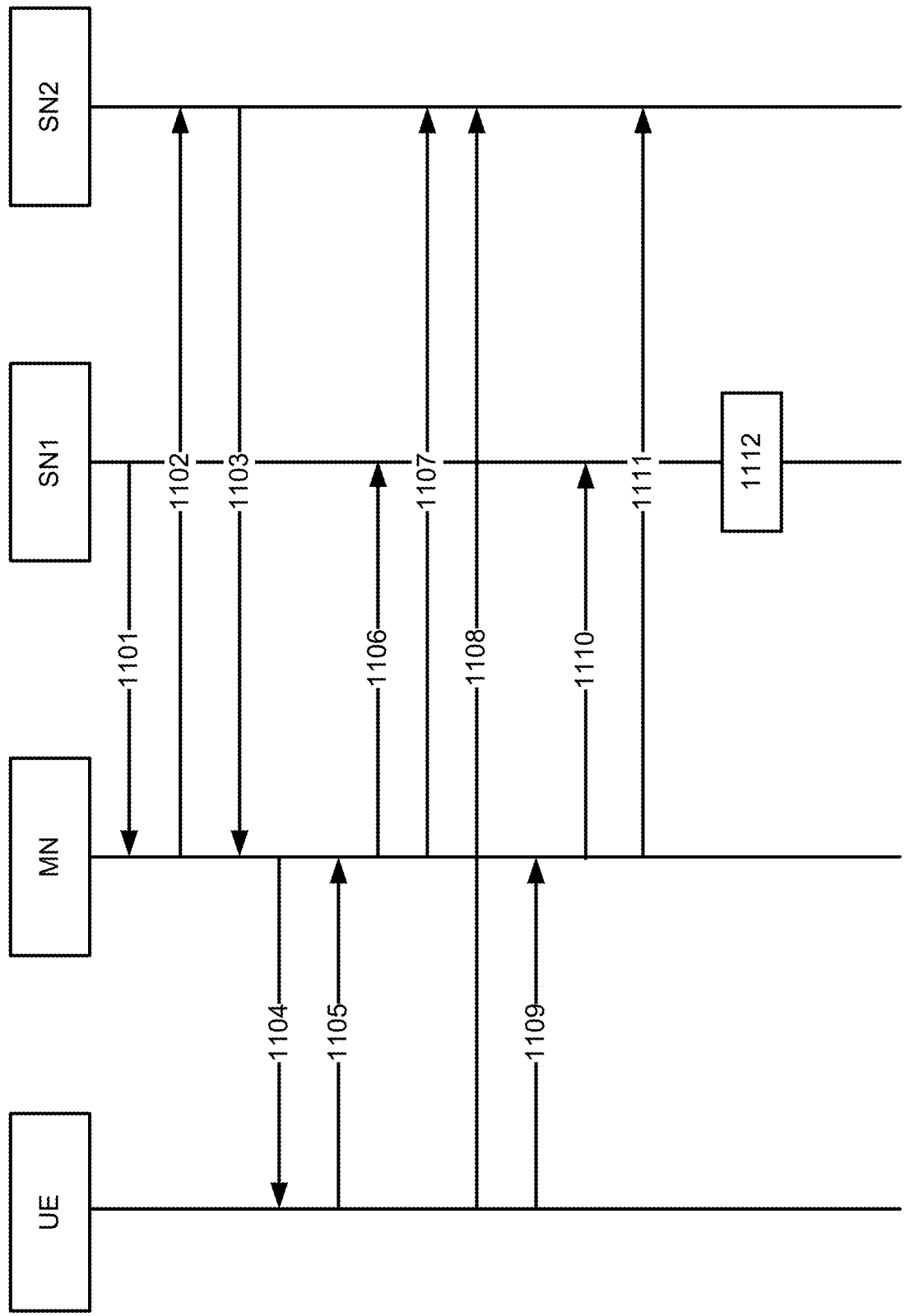
FIG. 11 shows another representative signaling procedure between the UE, the MN, and the SNs for an SN change.

FIG. 11 shows another representative signaling procedure between the UE, the MN, and the SNs (e.g., SN1 and SN2) for a SN change.

Step 7.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 1101, a message to MN to request SN change (e.g., SN Change Required). The message can carry information that identifies Cell 2 provided by SN2.

Step 7.2: The MN transmits, at 1102, a message (e.g., SN Addition Request) to the SN2 to request adding the SN2 as a secondary node to the UE. The message can carry information that identifies Cell 2 provided by the SN2.

Step 7.3: The SN2 transmits, at 1103, a message (e.g., SN Addition Request Acknowledge) to the MN to acknowledge the request to add the SN2 as a secondary communication node.

Step 7.4: The MN transmits, at 1104, a message (e.g., an RRC) Reconfiguration) to the UE to reconfigure the connection between UE and SN2.

Step 7.5: The UE transmits, at 1105, a message (e.g., an RRC Reconfiguration Complete) to indicate that the reconfiguration has completed.

Step 7.6: The MN transmits, at 1106, a message (e.g., SN Change Confirm) to the SN1 to confirm the SN change.

Step 7.7: The MN transmits, at 1107, a message (e.g., SN Reconfiguration Complete) to the SN2 to indicate that reconfiguration of the secondary node is completed.

Step 7.8: The UE encounters, at 1108, a failure when accessing Cell2.

Step 7.9: The UE transmits, at 1109, a message (e.g., SN Failure Information) to the MN to indicate the failure information. The information may include indicator(s) to indicate that an RLF has occurred when the UE attempted to access Cell 2. The information may also include measurement results for both Cell 1 from the UE.

Step 7.10: The MN forwards, at 1110, the failure information in a message (e.g., SN Failure Information) to the SN1.

Step 7.11: The MN forwards, at 1110, the failure information in a message (e.g., SN Failure Information) to the SN2.

Step 7.12: Based on the message (e.g., SN Failure Information), the SN1 determines that a failure has occurred when the UE tried to access Cell2. In some embodiments, based on the measurement results in the message, the SN1 can determine that Cell3 provided by SN3 is a more suitable cell for the UE. The SN1 then determines, at 1112, that the SN change to SN2 was a Wrong SN Change. The SN1 can accumulate statistics for improper SN changes such as a Wrong SN Changes. The SN1 then can adjust one or more thresholds to trigger SN change to SN2, as well as SN changes to SN3, based on the accumulated statistics. For example, when Wrong SN Changes from SN1 to SN2 happen too often, the adjusted thresholds can reduce the number of improper SN changes from SN1 to SN2. Meanwhile, SN changes from SN1 to SN3 can be adjusted to happen more often.

Example Embodiment 8

Figure 12:
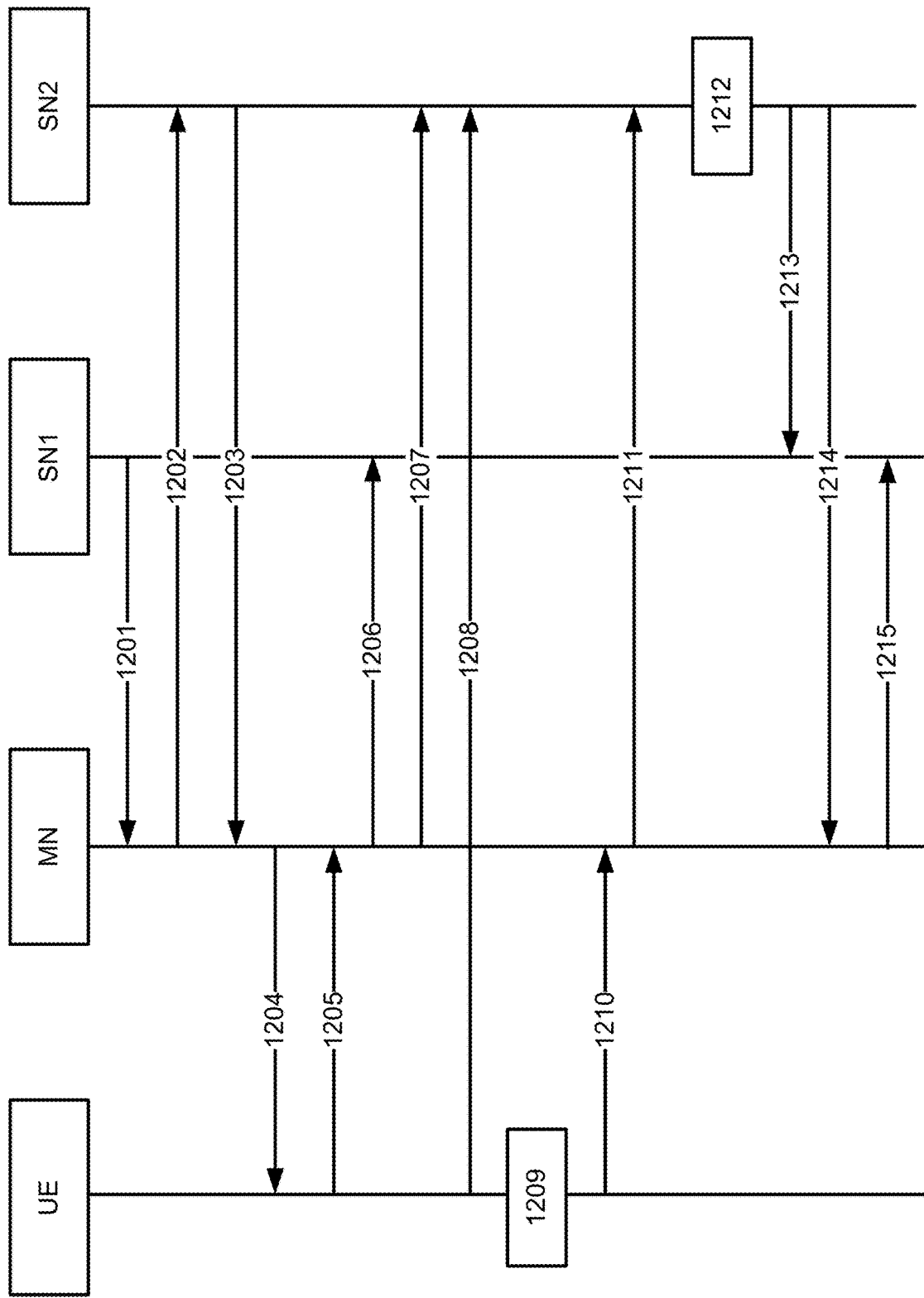
FIG. 12 shows another representative signaling procedure between the UE, the MN, and the SNs for an SN change.

FIG. 12 shows another representative signaling procedure between the UE, the MN, and the SNs (e.g., SN1 and SN2) for a SN change.

Step 8.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 1201, a message to MN to request SN change (e.g., SN Change Required). The message can carry information that identifies Cell 2 provided by SN2.

Step 8.2: The MN transmits, at 1202, a message (e.g., SN Addition Request) to the SN2 to request adding the SN2 as a secondary node to the UE. The message can carry information that identifies Cell 2 provided by the SN2.

Step 8.3: The SN2 transmits, at 1203, a message (e.g., SN Addition Request Acknowledge) to the MN to acknowledge the request to add the SN2 as a secondary communication node.

Step 8.4: The MN transmits, at 1204, a message (e.g., an RRC) Reconfiguration) to the UE to reconfigure the connection between UE and SN2.

Step 8.5: The UE transmits, at 1205, a message (e.g., an RRC Reconfiguration Complete) to indicate that the reconfiguration has completed.

Step 8.6: The MN transmits, at 1206, a message (e.g., SN Change Confirm) to the SN1 to confirm the SN change.

Step 8.7: The MN transmits, at 1207, a message (e.g., SN Reconfiguration Complete) to the SN2 to indicate that reconfiguration of the secondary node is completed.

Step 8.8: The UE now gains access, at 1208, to Cell 2.

Step 8.9: A Radio Link Failure (RLF) occurs, at 1209, in Cell 2.

Step 8.10: The UE transmits, at 1210, a message (e.g., SN Failure Information) to the MN to indicate the failure information. The information may include indicator(s) to indicate that an RLF has occurred in Cell 2. The information may also include measurement results for both Cell 1 and Cell 2 from the UE.

Step 8.11: Based on the message (e.g., SN Failure Information), the MN determines that an RLF has occurred in Cell2. In some embodiments, based on the measurement results in the message, the MN can determine that Cell 1 provided by SN1 is a more suitable cell for the UE. In some embodiments, based on the measurement results in the message, the MN determines that Cell3 provided SN3 is a more suitable cell for the UE. The MN then transmits, at 1211, a message (e.g., SN Failure Indication) to SN2 to indicate the Cell2 in which the RLF has occurred and the more suitable cell (e.g., Cell1 or Cell3).

Step 8.12: After the SN2 receives the message from the MN, the SN2 determines, at 1212, whether an improper SN change has occurred. For example, in some embodiments, a more suitable SN is the SN1. The SN2 knows that an SN change from SN1 to SN2 was successful, but an RLF happened in SN2 right away, and it is desirable to switch the connection back to SN1. Thus, the SN2 can determine that the SN change from SN1 to SN2 was too early (e.g., Too Early SN Change). In some embodiments, a more suitable SN is the SN3. The SN2 knows that an SN change from SN1 to SN2 was successful, but an RLF happened in SN2 right away, and it is desirable to switch to a different SN than SN3. Thus, the SN2 can determine that the SN change from SN1 to SN2 was a Wrong SN Change.

Step 8.13: When there exists a direct interface between the SN1 and SN2, the SN2 transmits, at 1213, a message (e.g., SN Change Report) to the SN1 to report the change of SN. The message can indicate that the SN change (e.g., the change from SN1 to SN2) was improper. For example, the improper SN change can be a Too Early SN Change or a Wrong SN Change.

Step 8.14: When there is no direct interface between the SN1 and SN2, the SN2 first transmits, at 1214, a message (e.g., SN Change Report) to the MN to report the change of SN. The MN then forwards, at 1215, the message (e.g., SN Change Report) to the SN1. The message can indicate that the SN change (e.g., the change from SN1 to SN2) was improper. For example, the improper SN change can be a Too Early SN Change or a Wrong SN Change.

Step 8.15: The SN1 can accumulate statistics for improper SN changes such as a Wrong SN Change and other types of improper SN changes. The SN1 then can adjust one or more thresholds to trigger SN change to SN2 and/or to SN3 based on the accumulated statistics. For example, when Too Early SN Changes happen too often, the adjusted thresholds can reduce the number of SN changes from SN1 to SN2. After the adjustment, connection changes from SN1 to SN2 can be triggered at a lower frequency than the current frequency of SN1 to SN2 changes. As another example, when Wrong SN Changes from SN1 to SN2 happen too often, followed by SN changes to SN3, the thresholds can be adjusted to reduce the number of SN changes from SN1 to SN2 and/or to increase the number of SN changes from SN1 to SN3.

Example Embodiment 9

Figure 13:
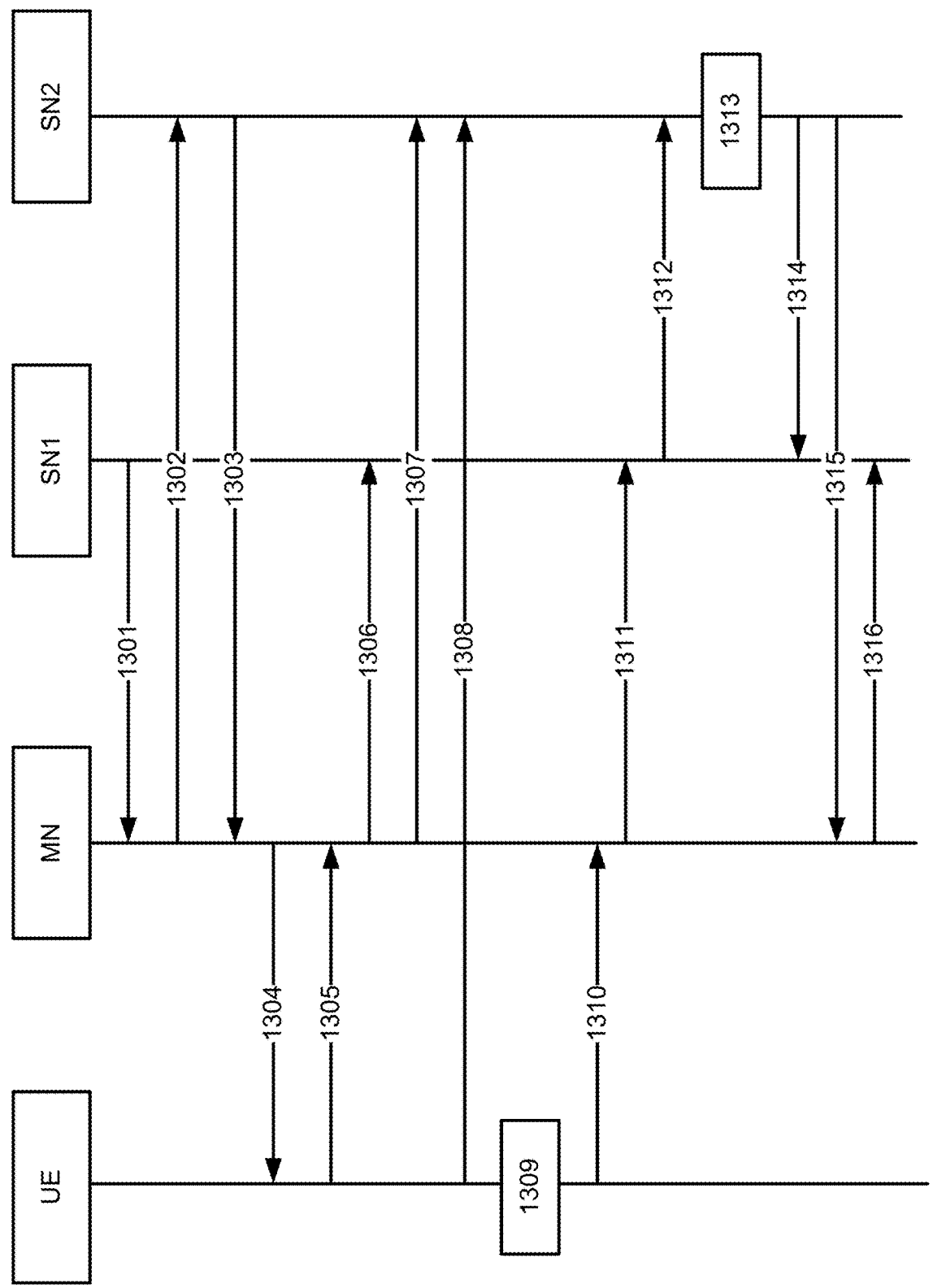
FIG. 13 shows another representative signaling procedure between the UE, the MN, and the SNs for an SN change.

FIG. 13 shows another representative signaling procedure between the UE, the MN, and the SNs (e.g., SN1 and SN2) for a SN change.

Step 9.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 1301, a message to MN to request SN change (e.g., SN Change Required). The message can carry information that identifies Cell 2 provided by SN2.

Step 9.2: The MN transmits, at 1302, a message (e.g., SN Addition Request) to the SN2 to request adding the SN2 as a secondary node to the UE. The message can carry information that identifies Cell 2 provided by the SN2.

Step 9.3: The SN2 transmits, at 1303, a message (e.g., SN Addition Request Acknowledge) to the MN to acknowledge the request to add the SN2 as a secondary communication node.

Step 9.4: The MN transmits, at 1304, a message (e.g., an RRC) Reconfiguration) to the UE to reconfigure the connection between UE and SN2.

Step 9.5: The UE transmits, at 1305, a message (e.g., an RRC Reconfiguration Complete) to indicate that the reconfiguration has completed.

Step 9.6: The MN transmits, at 1306, a message (e.g., SN Change Confirm) to the SN1 to confirm the SN change.

Step 9.7: The MN transmits, at 1307, a message (e.g., SN Reconfiguration Complete) to the SN2 to indicate that reconfiguration of the secondary node is completed.

Step 9.8: The UE now gains access, at 1308, to Cell 2.

Step 9.9: A Radio Link Failure (RLF) occurs, at 1309, in Cell 2.

Step 9.10: The UE transmits, at 1310, a message (e.g., SN Failure Information) to the MN to indicate the failure information. The information may include indicator(s) to indicate that an RLF has occurred in Cell 2. The information may also include measurement results for both Cell 1 and Cell 2 from the UE.

Step 9.11: Based on the message (e.g., SN Failure Information), the MN determines that an RLF has occurred in Cell2. In some embodiments, based on the measurement results in the message, the MN can determine that Cell 1 provided by SN1 is a more suitable cell for the UE. The MN then forwards, at 1311, the failure information (e.g., SN Failure Information) to the more suitable SN1.

Step 9.12: The SN1 transmits, at 1312, a message (e.g., SN Failure Indication) to SN2. The message includes information such as the SN (e.g., SN2) in which the RLF has occurred and a more suitable SN (e.g., SN1) for the UE to establish a connection.

Step 9.13: After the SN2 receives the message from the MN, the SN2 determines, at 1313, whether an improper SN change has occurred. For example, in some embodiments, a more suitable SN is the SN1. The SN2 knows that an SN change from SN1 to SN2 was successful, but an RLF happened in SN2 right away, and it is desirable to switch the connection back to SN1. Thus, the SN2 can determine that the SN change from SN1 to SN2 was too early (e.g., Too Early SN Change).

Step 9.14: When there exists a direct interface between the SN1 and SN2, the SN2 transmits, at 1314, a message (e.g., SN Change Report) to the SN1 to report the change of SN. The message can indicate that the SN change (e.g., the change from SN1 to SN2) was improper. For example, the improper SN change can be a Too Early SN Change.

Step 9.15: When there is no direct interface between the SN1 and SN2, the SN2 first transmits, at 1315, a message (e.g., SN Change Report) to the MN to report the change of SN. The MN then forwards, at 1316, the message (e.g., SN Change Report) to the SN1. The message can indicate that the SN change (e.g., the change from SN1 to SN2) was improper. For example, the improper SN change can be a Too Early SN Change.

Step 9.16: The SN1 can accumulate statistics for improper SN changes such as a Too Early SN Change and other types of improper SN changes. The SN1 then can adjust one or more thresholds to trigger SN change to SN2 based on the accumulated statistics. For example, when Too Early SN Changes happen too often, the adjusted thresholds can reduce the number of SN changes from SN1 to SN2. After the adjustment, connection changes from SN1 to SN2 can be triggered at a lower frequency than the current frequency of SN1 to SN2 changes.

Example Embodiment 10

Figure 14:
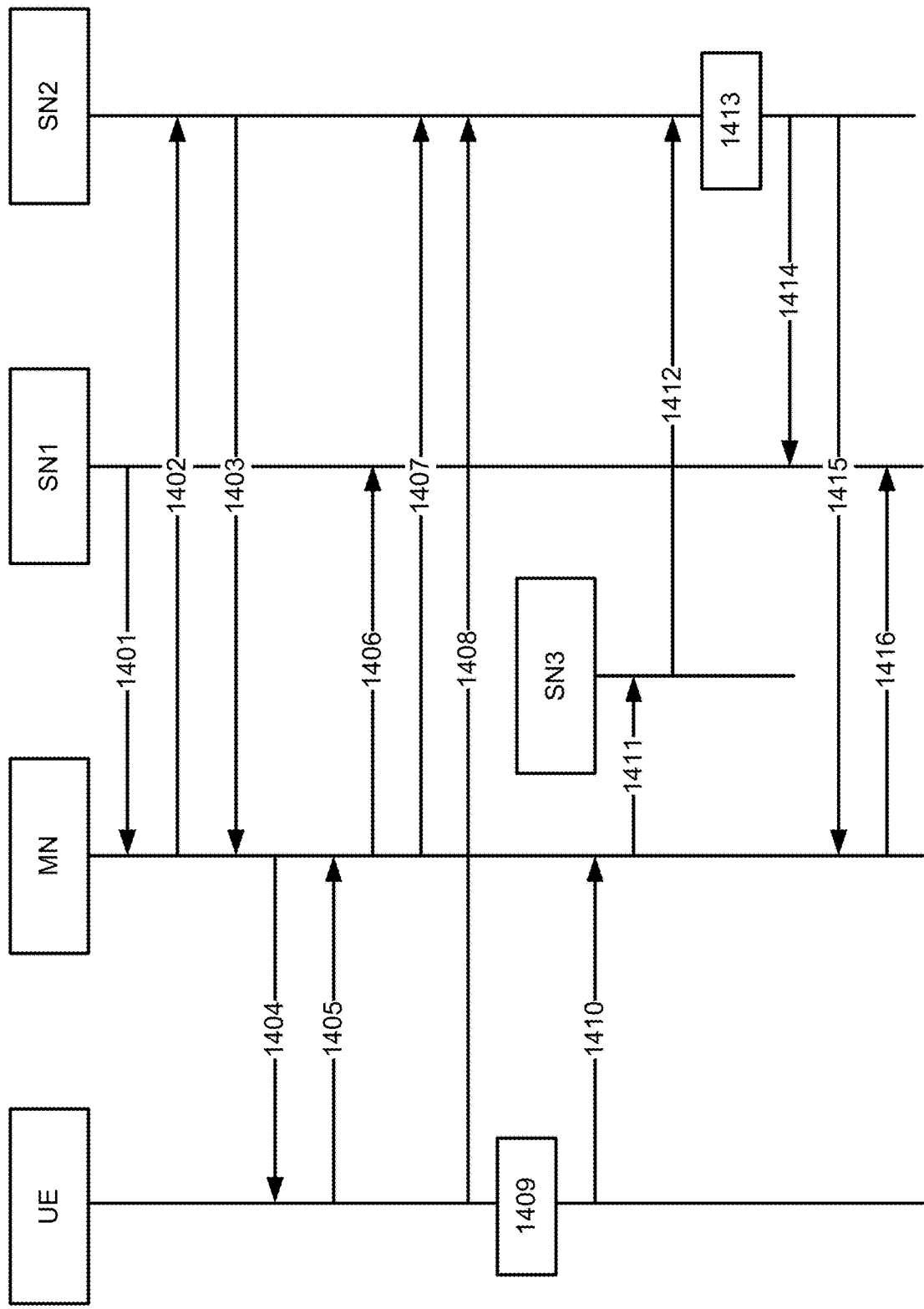
FIG. 14 shows another representative signaling procedure between the UE, the MN, and the SNs for an SN change.

FIG. 14 shows another representative signaling procedure between the UE, the MN, and the SNs (e.g., SN1 and SN2) for a SN change.

Step 10.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 1401, a message to MN to request SN change (e.g., SN Change Required). The message can carry information that identifies Cell 2 provided by SN2.

Step 10.2: The MN transmits, at 1402, a message (e.g., SN Addition Request) to the SN2 to request adding the SN2 as a secondary node to the UE. The message can carry information that identifies Cell 2 provided by the SN2.

Step 10.3: The SN2 transmits, at 1403, a message (e.g., SN Addition Request Acknowledge) to the MN to acknowledge the request to add the SN2 as a secondary communication node.

Step 10.4: The MN transmits, at 1404, a message (e.g., an RRC) Reconfiguration) to the UE to reconfigure the connection between UE and SN2.

Step 10.5: The UE transmits, at 1405, a message (e.g., an RRC Reconfiguration Complete) to indicate that the reconfiguration has completed.

Step 10.6: The MN transmits, at 1406, a message (e.g., SN Change Confirm) to the SN1 to confirm the SN change.

Step 10.7: The MN transmits, at 1407, a message (e.g., SN Reconfiguration Complete) to the SN2 to indicate that reconfiguration of the secondary node is completed.

Step 10.8: The UE now gains access, at 1408, to Cell 2.

Step 10.9: A Radio Link Failure (RLF) occurs, at 1409, in Cell 2.

Step 10.10: The UE transmits, at 1410, a message (e.g., SN Failure Information) to the MN to indicate the failure information. The information may include indicator(s) to indicate that an RLF has occurred in Cell 2. The information may also include measurement results for both Cell 1 and Cell 2 from the UE.

Step 10.11: Based on the message (e.g., SN Failure Information), the MN determines that an RLF has occurred in Cell2. In some embodiments, based on the measurement results in the message, the MN determines that Cell3 provided SN3 is a more suitable cell for the UE. The MN then forwards, at 1411, the failure information (e.g., SN Failure Information) to the SN3.

Step 10.12: Based on the failure information received from the MN, the SN3 transmits, at 1412, a message (e.g., SN Failure Indication) to SN2 to indicate the Cell2 in which the RLF has occurred and the more suitable cell (e.g., Cell3).

Step 10.13: After the SN2 receives the message from the SN3, the SN2 determines, at 1413, whether an improper SN change has occurred. For example, in some embodiments, SN3 is a more suitable SN. The SN2 knows that an SN change from SN1 to SN2 was successful, but an RLF happened in SN2 right away, and it is desirable to switch to a different SN (SN3). Thus, the SN2 can determine that the SN change from SN1 to SN2 was a Wrong SN Change.

Step 10.14: When there exists a direct interface between the SN1 and SN2, the SN2 transmits, at 1414, a message (e.g., SN Change Report) to the SN1 to report the change of SN. The message can indicate that the SN change (e.g., the change from SN1 to SN2) was improper. For example, the improper SN change can be a Wrong SN Change.

Step 10.15: When there is no direct interface between the SN1 and SN2, the SN2 first transmits, at 1415, a message (e.g., SN Change Report) to the MN to report the change of SN. The MN then forwards, at 1416, the message (e.g., SN Change Report) to the SN1. The message can indicate that the SN change (e.g., the change from SN1 to SN2) was improper. For example, the improper SN change can be a Wrong SN Change.

Step 10.16: The SN1 can accumulate statistics for improper SN changes such as a Wrong SN Change and other types of improper SN changes. The SN1 then can adjust one or more thresholds to trigger SN change to SN2 and/or to SN3 based on the accumulated statistics. For example, when Wrong SN Changes from SN1 to SN2 happen too often, followed by SN changes to SN3, the thresholds can be adjusted to reduce the number of SN changes from SN1 to SN2 and/or to increase the number of SN changes from SN1 to SN3.

Example Embodiment 11

Figure 15:
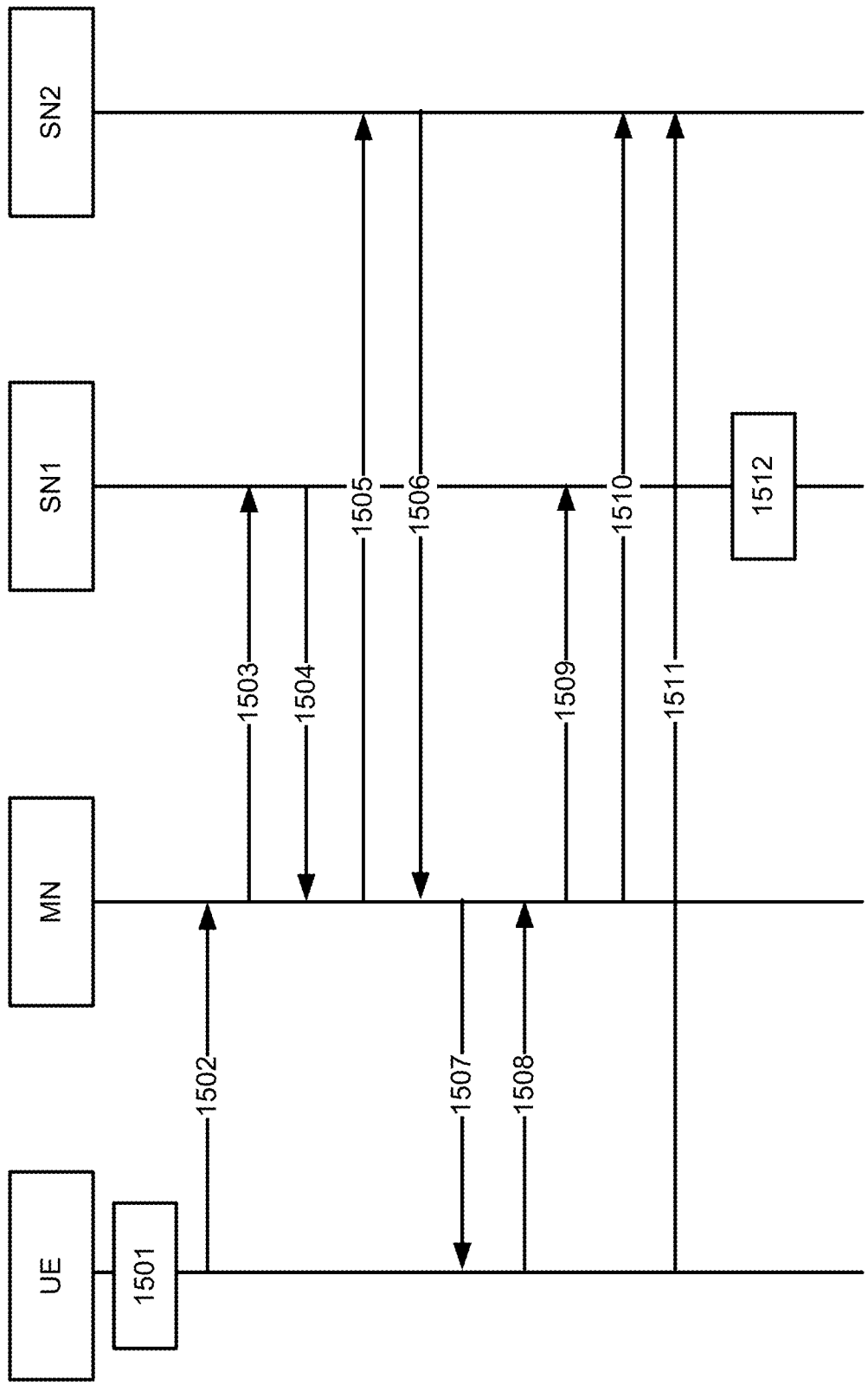
FIG. 15 shows another representative signaling procedure between the UE, the MN, and the SNs for an SN change.

FIG. 15 shows another representative signaling procedure between the UE, the MN, and the SNs (e.g., SN1 and SN2) for a SN change.

Step 11.1: The UE is dual-connected with the master node (MN) and secondary node 1 (SN1). The UE's primary serving cell provided by SN1 is Cell1. A Radio Link Failure (RLF) occurs, at 1501, in Cell 1.

Step 11.2: The UE transmits, at 1502, a message (e.g., SN Failure Information) to the MN to indicate the failure information. The information may include indicator(s) to indicate that an RLF has occurred in Cell 1. The information may also include measurement results for Cell 1 from the UE.

Step 11.3: Based on the failure information (e.g., SN Failure Information) received from the UE, the MN transmits, at 1503, a message (e.g., SN Failure Indication) to the SN1. The message includes information such as the SN (e.g., SN1) in which the RLF has occurred and a more suitable SN (e.g., SN2) for a new connection.

Step 11.4: The SN1 finds that SN2 provides a more suitable cell (e.g., Cell2). Thus, SN1 transmits, at 1504, a message to MN to request SN change (e.g., SN Change Required). The message can carry information that identifies Cell 2 provided by the SN2.

Step 11.5: The MN transmits, at 1505, a message (e.g., SN Addition Request) to the SN2 to request adding the SN2 as a secondary node to the UE. The message can carry information that identifies Cell 2.

Step 11.6: The SN2 transmits, at 1506, a message (e.g., SN Addition Request Acknowledge) to the MN to acknowledge the request to add the SN2 as a secondary node.

Step 11.7: The MN transmits, at 1507, a message (e.g., an RRC Reconfiguration) to the UE to reconfigure the connection between UE and SN2.

Step 11.8: The UE transmits, at 1508, a message (e.g., an RRC Reconfiguration Complete) to indicate that the reconfiguration has completed.

Step 11.9: The MN transmits, at 1509, a message (e.g., SN Change Confirm) to the SN1 to confirm the SN change.

Step 11.10: The MN transmits, at 1510, a message (e.g., SN Reconfiguration Complete) to the SN2 to indicate that reconfiguration of the secondary node is completed.

Step 11.11: The UE now gains access, at 1511, to Cell 2.

Step 11.12: Based on the message (e.g., SN Failure Indication) previously received from the MN, the SN1 knows that an RLF occurred prior to an SN change request was sent. A new connection to the SN2 was established successfully later. The SN1 then determines, at 1512, that the SN change to SN2 was too late (also known as Too Late SN Change).

Step 11.13: The SN1 can accumulate statistics for improper SN changes such as Too Late SN Changes and other types of improper SN changes. The SN1 then can adjust one or more thresholds to trigger SN change to SN2 based on the accumulated statistics. For example, when Too Late SN Changes happen too often, the adjusted thresholds can increase the number of SN changes from SN1 to SN2.

Example Embodiment 12

Figure 16:
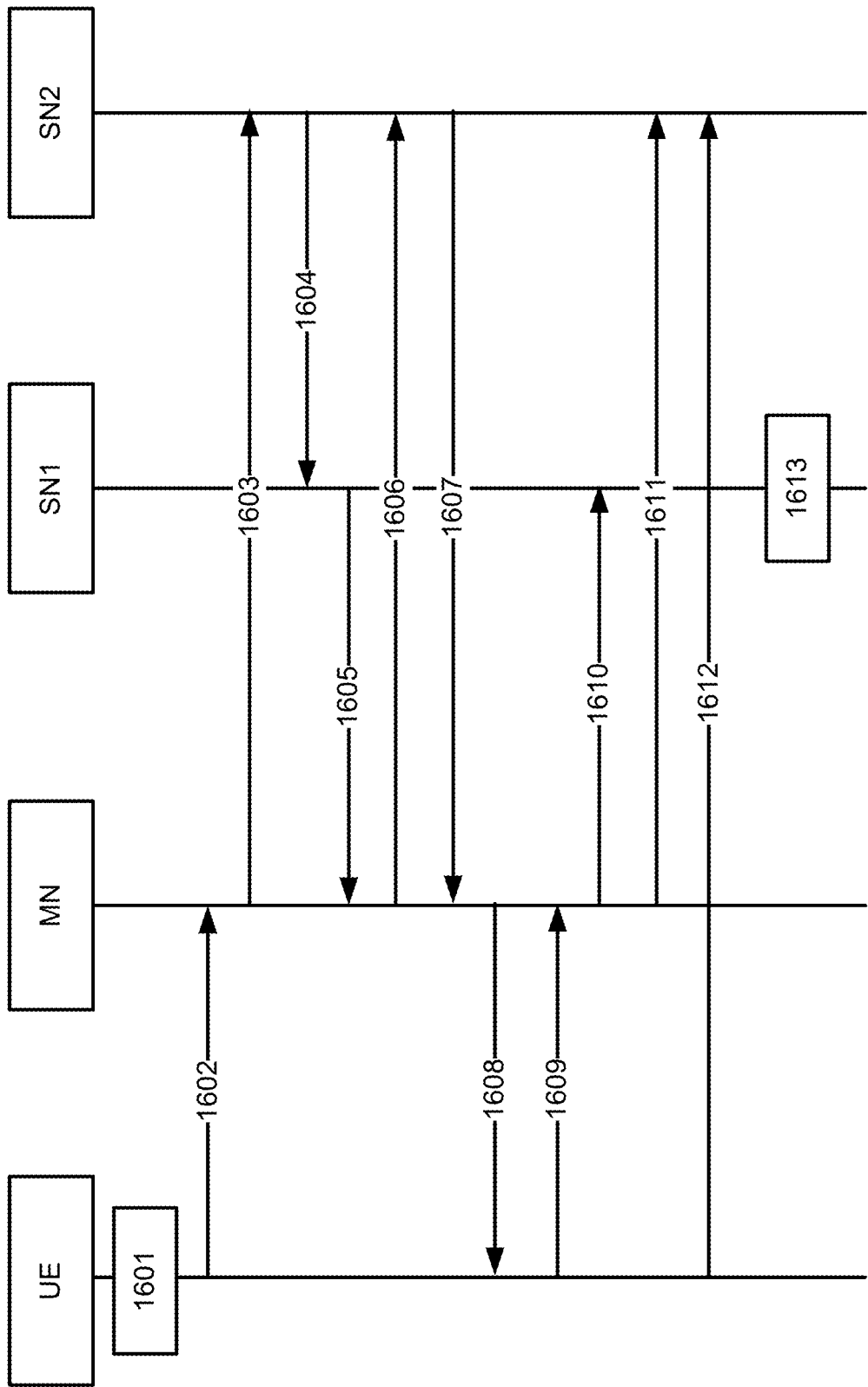
FIG. 16 shows another representative signaling procedure between the UE, the MN, and the SNs for an SN change.

FIG. 16 shows another representative signaling procedure between the UE, the MN, and the SNs (e.g., SN1 and SN2) for a SN change.

Step 12.1: The UE is dual-connected with the master node (MN) and secondary node 1 (SN1). The UE's primary serving cell provided by SN1 is Cell1. A Radio Link Failure (RLF) occurs, at 1601, in Cell 1.

Step 12.2: The UE transmits, at 1602, a message (e.g., SN Failure Information) to the MN to indicate the failure information. The information may include indicator(s) to indicate that an RLF has occurred in Cell 1. The information may also include measurement results for Cell 1 from the UE.

Step 12.3: The MN forwards, at 1603, the failure information (e.g., SN Failure Information) to the SN2.

Step 12.4: Based on the failure information (e.g., SN Failure Information) received from the MN, the SN2 transmits, at 1604, a message (e.g., SN Failure Indication) to the SN1. The message includes information such as the SN (e.g., SN1) in which the RLF has occurred and a more suitable SN (e.g., SN2) for a new connection.

Step 12.5: The SN1 finds that SN2 provides a more suitable cell (e.g., Cell2). Thus, SN1 transmits, at 1605, a message to MN to request SN change (e.g., SN Change Required). The message can carry information that identifies Cell 2 provided by the SN2.

Step 12.6: The MN transmits, at 1606, a message (e.g., SN Addition Request) to the SN2 to request adding the SN2 as a secondary node to the UE. The message can carry information that identifies Cell 2.

Step 12.7: The SN2 transmits, at 1607, a message (e.g., SN Addition Request Acknowledge) to the MN to acknowledge the request to add the SN2 as a secondary node.

Step 12.8: The MN transmits, at 1608, a message (e.g., an RRC Reconfiguration) to the UE to reconfigure the connection between UE and SN2.

Step 12.9: The UE transmits, at 1609, a message (e.g., an RRC Reconfiguration Complete) to indicate that the reconfiguration has completed.

Step 12.10: The MN transmits, at 1610, a message (e.g., SN Change Confirm) to the SN1 to confirm the SN change.

Step 12.11: The MN transmits, at 1611, a message (e.g., SN Reconfiguration Complete) to the SN2 to indicate that reconfiguration of the secondary node is completed.

Step 12.12: The UE now gains access, at 1612, to Cell 2.

Step 12.13: Based on the message (e.g., SN Failure Indication) previously received from the SN2, the SN1 knows that an RLF occurred right prior to an SN change request was sent from the SN1. A new connection to the SN2 was established successfully later. The SN1 then determines, at 1613, that the SN change to SN2 was too late (also known as Too Late SN Change).

Step 12.14: The SN1 can accumulate statistics for improper SN changes such as Too Late SN Changes and other types of improper SN changes. The SN1 then can adjust one or more thresholds to trigger SN change to SN2 based on the accumulated statistics. For example, when Too Late SN Changes happen too often, the adjusted thresholds can increase the number of SN changes from SN1 to SN2.

Example Embodiment 13

Figure 17:
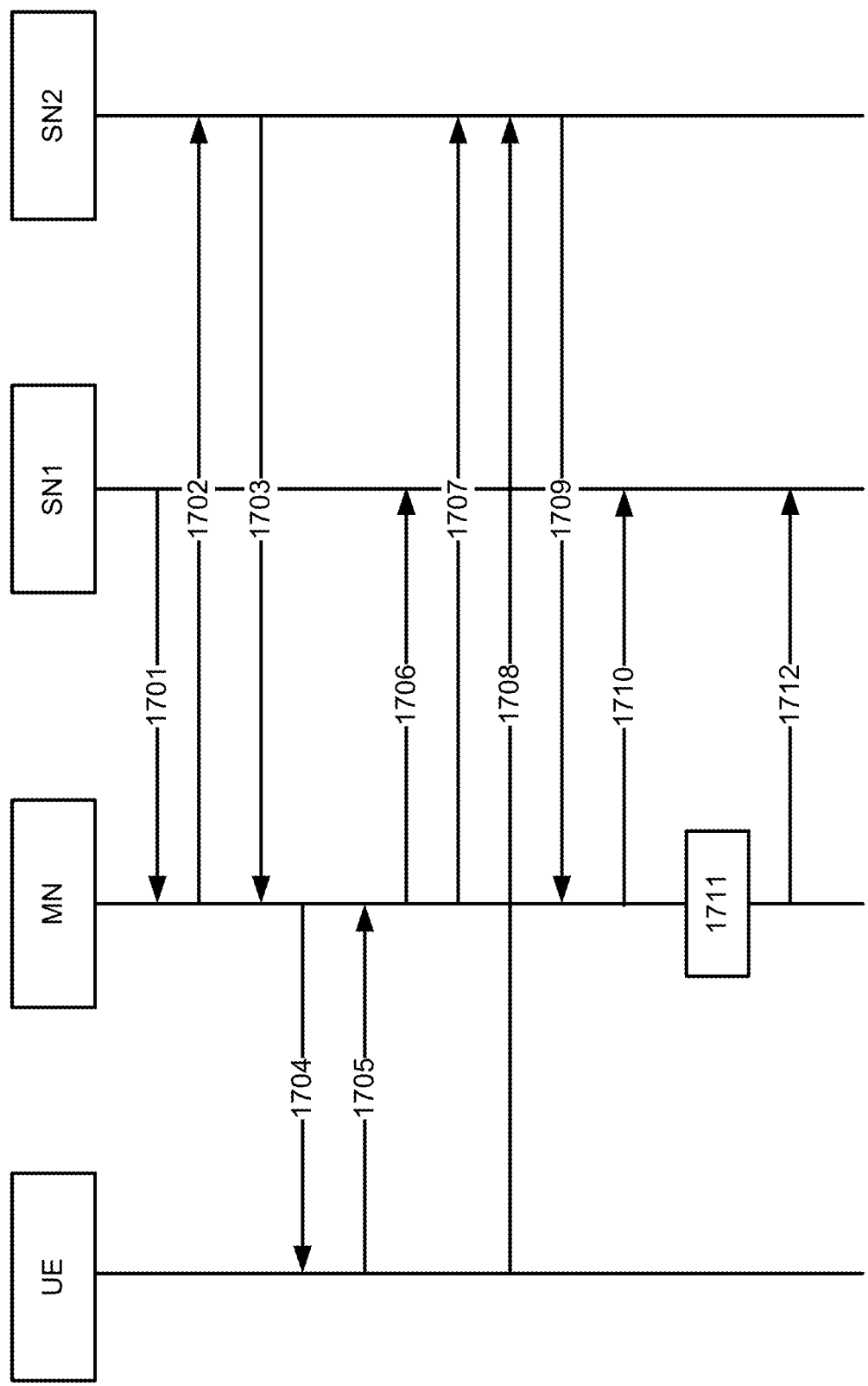
FIG. 17 shows another representative signaling procedure between the UE, the MN, and the SNs for an SN change.

FIG. 17 shows another representative signaling procedure between the UE, the MN, and the SNs (e.g., SN1 and SN2) for a SN change.

Step 13.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 1701, a message to MN to request SN change (e.g., SN Change Required). The message can carry information that identifies Cell 2 provided by SN2.

Step 13.2: The MN transmits, at 1702, a message (e.g., SN Addition Request) to the SN2 to request adding the SN2 as a secondary node to the UE. The message can carry information that identifies Cell 2.

Step 13.3: The SN2 transmits, at 1703, a message (e.g., SN Addition Request Acknowledge) to the MN to acknowledge the request to add the SN2 as a secondary communication node.

Step 13.4: The MN transmits, at 1704, a message (e.g., an RRC) Reconfiguration) to the UE to reconfigure the connection between UE and SN2.

Step 13.5: The UE transmits, at 1705, a message (e.g., an RRC Reconfiguration Complete) to indicate that the reconfiguration has completed.

Step 13.6: The MN transmits, at 1706, a message (e.g., SN Change Confirm) to the SN1 to confirm the SN change.

Step 13.7: The MN transmits, at 1707, a message (e.g., SN Reconfiguration Complete) to the SN2 to indicate that reconfiguration of the secondary node is completed.

Step 13.8: The UE now gains access, at 1708, to Cell 2.

Step 13.9: The SN2 transmits, at 1709, a message to MN to request SN change (e.g., SN Change Required). The message can carry information that identifies Cell 1 provided by SN1.

Step 13.10: The MN transmits, at 1710, a message (e.g., SN Addition Request) to the SN1 to request adding the SN1 as a secondary node to the UE. The message can carry information that identifies Cell 1.

Step 13.11: The MN can determine, based on the messages that it receives from the SN1 and SN2 (e.g., SN Change Required), that an SN change from SN2 to SN1 is requested right after the SN change from SN1 to SN2 is completed. The MN also knows that there is no RLF when the UE is connected to the SN1 and/or SN2. Thus, the MN can determine, at 1711, that a Ping-Pong SN change between SN1 and SN2 has occurred.

Step 13.12: The MN transmits, at 1712, a message (e.g., SN Change Report) to the SN1 to report the change of SN. The message can carry information indicating that a Ping-Pong SN change has occurred.

Step 13.13: The SN1 can accumulate statistics for improper SN changes such as a Ping-Pong SN Changes and other types of improper SN changes. The SN1 then can adjust one or more thresholds to trigger SN change to SN2 based on the accumulated statistics. For example, when Ping-Pong SN Changes between SN1 and SN2 happen too often, the thresholds can be adjusted to reduce the number of SN changes from SN1 to SN2, or to reduce the number of SN changes from SN2 to SN1.

Example Embodiment 14

Figure 18:
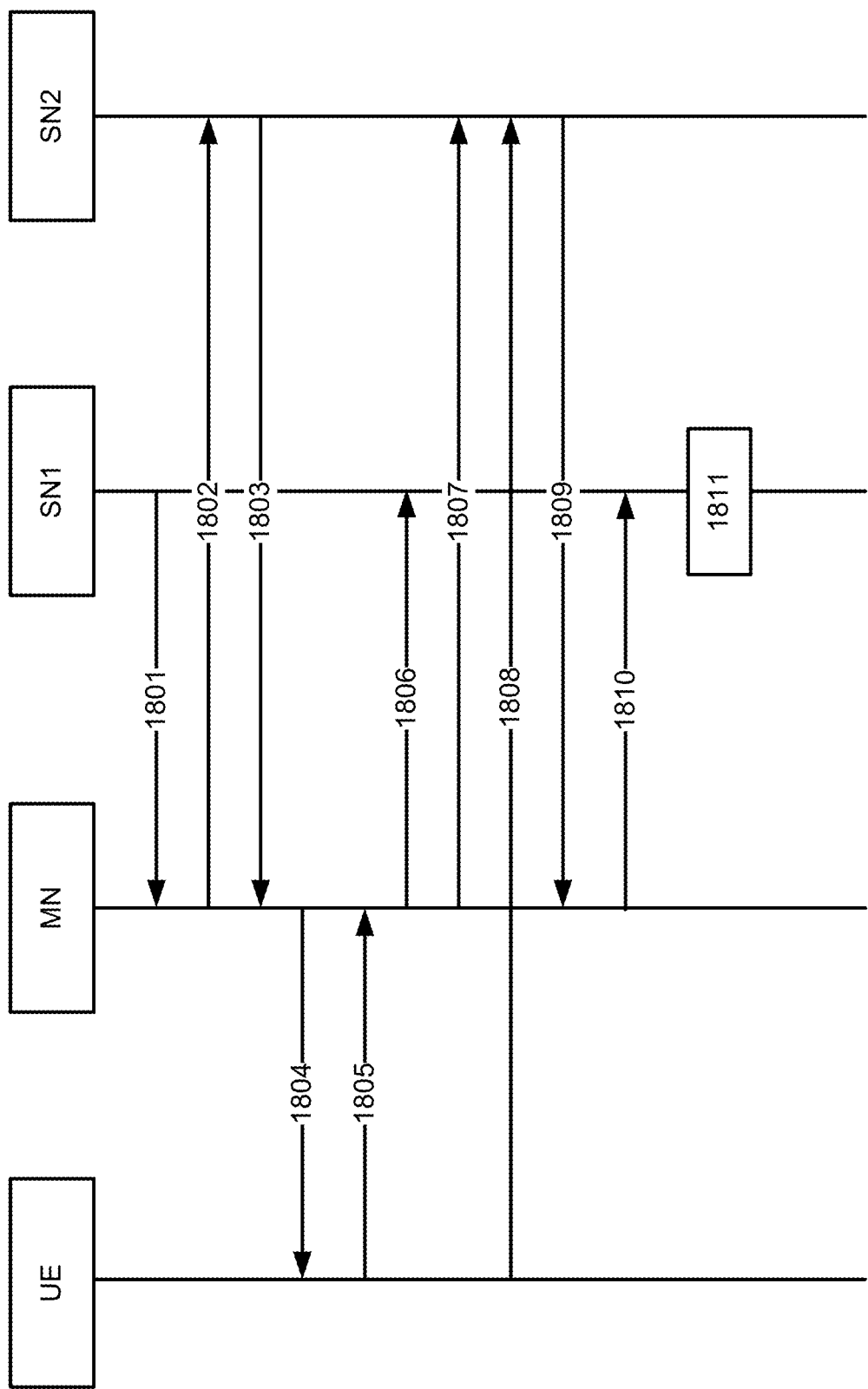
FIG. 18 shows yet another representative signaling procedure between the UE, the MN, and the SNs for an SN change.

FIG. 18 shows yet another representative signaling procedure between the UE, the MN, and the SNs (e.g., SN1 and SN2) for a SN change.

Step 14.1: The UE is dual-connected with the master node (MN) and secondary node 1 (SN1). The UE's primary serving cell provided by SN1 is Cell1. SN1 finds that SN2 provides a more suitable cell (e.g., Cell2). Thus, SN1 transmits, at 1801, a message to MN to request SN change (e.g., SN Change Required). The message can carry information that identifies Cell 2 provided by SN2.

Step 14.2: The MN transmits, at 1802, a message (e.g., SN Addition Request) to the SN2 to request adding the SN2 as a secondary node to the UE. The message can carry information that identifies Cell 2.

Step 14.3: The SN2 transmits, at 1803, a message (e.g., SN Addition Request Acknowledge) to the MN to acknowledge the request to add the SN2 as a secondary communication node.

Step 14.4: The MN transmits, at 1804, a message (e.g., an RRC) Reconfiguration) to the UE to reconfigure the connection between UE and SN2.

Step 14.5: The UE transmits, at 1805, a message (e.g., an RRC Reconfiguration Complete) to indicate that the reconfiguration has completed.

Step 14.6: The MN transmits, at 1806, a message (e.g., SN Change Confirm) to the SN1 to confirm the SN change.

Step 14.7: The MN transmits, at 1807, a message (e.g., SN Reconfiguration Complete) to the SN2 to indicate that reconfiguration of the secondary node is completed.

Step 14.8: The UE now gains access, at 1808, to Cell 2.

Step 14.9: The SN2 transmits, at 1809, a message to MN to request SN change (e.g., SN Change Required). The message can carry information that identifies Cell 1 provided by SN1.

Step 14.10: The MN transmits, at 1810, a message (e.g., SN Addition Request) to the SN1 to request adding the SN1 as a secondary node to the UE. The message can carry information that identifies Cell 1.

Step 14.11: The SN1 can determine, based on the message that it receives from the MN (e.g., SN Addition Request), that an SN change from SN2 to SN1 is requested right after the SN change from SN1 to SN2 is completed. The SN1 also knows that there is no RLF when the UE is connected to the SN1 and/or SN2. Thus, the SN1 can determine, at 1811, that a Ping-Pong SN change between SN1 and SN2 has occurred.

Step 14.12: The SN1 can accumulate statistics for improper SN changes such as a Ping-Pong SN Changes and other types of improper SN changes. The SN1 then can adjust one or more thresholds to trigger SN change to SN2 based on the accumulated statistics. For example, when Ping-Pong SN Changes between SN1 and SN2 happen too often, the thresholds can be adjusted to reduce the number of SN changes from SN1 to SN2, or to reduce the number of SN changes from SN2 to SN1.

It is thus evident that methods and corresponding apparatus relating to handling secondary node changes in dual connectivity mode are disclosed. Various embodiments using the disclosed techniques can be implemented to allow either the master communication node or the secondary communication node to make better future decisions for communication node changes, thereby reducing the number of improper communication node changes.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of wireless communication,
receiving, at a master communication node, a first message from a first secondary communication node requesting a change from a first connection between a mobile device and the first secondary communication node to a second connection between the mobile device and a second secondary communication node, wherein the first message includes information identifying the second secondary communication node;
transmitting, from the master communication node, a second message to the second secondary communication node to request establishing the second connection between the mobile device and the second secondary communication node;
receiving, at the master communication node, a third message from the mobile device confirming a configuration of the second connection between the mobile device and the second secondary communication node;
receiving at the master communication node, a fourth message from the mobile device indicating a failure of the second connection between the mobile device and the second secondary communication node; and
transmitting, from the master communication node, a fifth message to the first secondary communication node reporting that the change from the first connection to the second connection is an improper change.

2. The method of claim 1, comprising:
determining, by the master communication node, to change from the second connection between the mobile device and the second secondary communication node to a third connection between the mobile device and a third secondary communication node.

3. The method of claim 2, wherein the determining to change from the second connection to the third connection comprises:
receiving, at the master communication node, a sixth message from the second secondary communication node, the sixth message requesting to change the second connection to the third connection, wherein the sixth message includes information identifying the third secondary communication node.

4. The method of claim 2, wherein the determining to change from the second connection to the third connection comprises:
identifying, by the master communication node, based on measurement results included in the fourth message, the third secondary communication node to be used for establishing the third connection.

5. The method of claim 1, wherein the master communication node indicates the improper change from the first connection to the second connection using one of the following types of reason codes: Wrong Secondary Node Change, Too Early Secondary Node Change, Too Late Secondary Node Change, or Ping-Pong Secondary Node Change.

6. A method for wireless communication, comprising:
transmitting, from a first secondary communication node, a first message to a master communication node to request a change from a first connection between a mobile device and the first secondary communication node to a second connection between the mobile device and a second secondary communication node;
receiving, at the first secondary communication node, a second message from the master communication node confirming the change from the first connection to the second connection;
receiving, at the first secondary communication node, a third message indicating a failure of the second connection between the mobile device and the second secondary communication node; and
determining, by the first secondary communication node based on the third message that the change from the first connection to the second connection is an improper change.

7. The method of claim 6, wherein the third message is received from the second secondary communication node, the third message including information for reporting that the change from the first connection to the second connection is an improper change.

8. The method of claim 6, wherein the third message is received from the master communication node, and wherein the method further comprises:
transmitting, from the first secondary communication node prior to determining the improper change, a fourth message to the second secondary communication node indicating the failure of the second connection between the mobile device and the secondary communication node; and receiving, at the first secondary communication node, a fifth message from the second secondary communication node reporting that the change from the first connection to the second connection is an improper change.

9. The method of claim 6, wherein the improper change from the first connection to the second connection is indicated using one of the following types of reason codes: Wrong Secondary Node Change, Too Early Secondary Node Change, Too Late Secondary Node Change, or Ping-Pong Secondary Node Change.

10. The method of claim 6, wherein the improper change from the first connection to the second connection is indicated using a Too Early Secondary Node Change reason code or a Wrong Secondary Node Change reason code.

11. An apparatus for wireless communication, comprising:
a processor; and
a memory including processor executable code, wherein the processor executable code upon execution by the processor configures the processor to:
receive a first message from a first secondary communication node requesting a change from a first connection between a mobile device and the first secondary communication node to a second connection between the mobile device and a second secondary communication node, wherein the first message includes information identifying the second secondary communication node;
transmit a second message to the second secondary communication node to request establishing the second connection between the mobile device and the second secondary communication node;
receive a third message from the mobile device confirming a configuration of the second connection between the mobile device and the second secondary communication node;
receive a fourth message from the mobile device indicating a failure of the second connection between the mobile device and the second secondary communication node; and
transmit a fifth message to the first secondary communication node reporting that the change from the first connection to the second connection is an improper change.

12. The apparatus of claim 11, wherein the processor is configured to:
determine to change from the second connection between the mobile device and the second secondary communication node to a third connection between the mobile device and a third secondary communication node.

13. The apparatus of claim 12, wherein the processor is configured to:
receive a sixth message from the second secondary communication node, the sixth message requesting to change the second connection to the third connection, wherein the sixth message includes information identifying the third secondary communication node.

14. The apparatus of claim 12, wherein the processor is configured to:
identify, based on measurement results included in the fourth message, the third secondary communication node to be used for establishing the third connection.

15. The apparatus of claim 11, wherein the processor is configured to indicate the improper change from the first connection to the second connection using one of the following types of reason codes: Wrong Secondary Node Change, Too Early Secondary Node Change, Too Late Secondary Node Change, or Ping-Pong Secondary Node Change.

16. An apparatus for wireless communication, comprising:
a processor; and
a memory including processor executable code, wherein the processor executable code upon execution by the processor configures the processor to:
transmit a first message to a master communication node to request a change from a first connection between a mobile device and the first secondary communication node to a second connection between the mobile device and a second secondary communication node;
receive a second message from the master communication node confirming the change from the first connection to the second connection;
receive a third message indicating a failure of the second connection between the mobile device and the second secondary communication node; and
determine, based on the third message that the change from the first connection to the second connection is an improper change.

17. The apparatus of claim 16, wherein the processor is configured to receive the third message from the second secondary communication node, the third message including information for reporting that the change from the first connection to the second connection is an improper change.

18. The apparatus of claim 16, wherein the processor is configured to receive the third message from the master communication node, the method further configured to:
transmit, prior to determining the improper change, a fourth message to the second secondary communication node indicating the failure of the second connection between the mobile device and the secondary communication node; and
receive a fifth message from the second secondary communication node reporting that the change from the first connection to the second connection is an improper change.

19. The apparatus of claim 16, wherein the improper change from the first connection to the second connection is indicated using one of the following types of reason codes: Wrong Secondary Node Change, Too Early Secondary Node Change, Too Late Secondary Node Change, or Ping-Pong Secondary Node Change.

20. The apparatus of claim 16, wherein the improper change from the first connection to the second connection is indicated using a Too Early Secondary Node Change reason code or a Wrong Secondary Node Change reason code.

* * * * *